US008417595B2

(12) United States Patent
Keyes et al.

(10) Patent No.: US 8,417,595 B2
(45) Date of Patent: Apr. 9, 2013

(54) ECONOMIC CALCULATIONS IN A PROCESS CONTROL SYSTEM

(75) Inventors: Marion A. Keyes, St. Louis, MO (US); Mark J. Nixon, Round Rock, TX (US); Terrence Lynn Blevins, Round Rock, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 0 days.

(21) Appl. No.: 12/779,642

(22) Filed: May 13, 2010

(65) Prior Publication Data

US 2010/0293019 A1 Nov. 18, 2010

Related U.S. Application Data

(60) Division of application No. 10/798,101, filed on Mar. 11, 2004, now Pat. No. 7,720,727, and a continuation-in-part of application No. 10/123,445, filed on Apr. 15, 2002, and a continuation-in-part of application No. 09/953,811, filed on Sep. 17, 2001, now Pat. No. 7,206, 646.

(60) Provisional application No. 60/491,066, filed on Jul. 30, 2003, provisional application No. 60/273,164, filed on Mar. 1, 2001.

(51) Int. Cl.
*G07B 17/00* (2006.01)
*G06F 17/60* (2006.01)

(52) U.S. Cl.
USPC ............................................ 705/30; 364/402

(58) Field of Classification Search ...................... 705/30
See application file for complete search history.

(56) References Cited

U.S. PATENT DOCUMENTS 3,096,434 A 7/1963 King
3,404,264 A 10/1968 Kugler
(Continued)

FOREIGN PATENT DOCUMENTS

CN 1007757 4/1990
CN 1097804 1/1995
(Continued)

OTHER PUBLICATIONS

"Process control system utilizing economic models" to Keyes et al. GB 0416908.2, Jul. 30, 2003.*

(Continued)

*Primary Examiner* — Garcia Ade
(74) *Attorney, Agent, or Firm* — Marshall, Gerstein & Borun LLP

(57) ABSTRACT

A process control system includes economic models disposed in communication with process control modules, as well as with sources of economic data such as cost, throughput and profit data, and uses the economic models to determine useful economic parameters or information associated with the actual operation of the process plant at the time the plant is operating. The economic models can be used to provide financial statistics such as profitability, cost of manufactured product, etc. in real time based on the actual current operating state of the process and the business data associated with the finished product, raw materials, etc. These financial statistics can be used to drive alarms and alerts within the process network and be used as inputs to process plant optimizers, etc. to provide for better or more optimal control of the process and to provide a better understanding of the conditions which lead to maximum profitability of the plant.

41 Claims, 8 Drawing Sheets

U.S. PATENT DOCUMENTS

| | | |
|---|---|---|
| 3,701,280 A | 10/1972 | Stroman |
| 3,705,516 A | 12/1972 | Reis |
| 3,981,836 A | 9/1976 | Pangle, Jr. et al. |
| RE29,383 E | 9/1977 | Gallatin et al. |
| 4,058,275 A | 11/1977 | Banks et al. |
| 4,088,413 A | 5/1978 | Rossignol de la Ronde et al. |
| 4,099,413 A | 7/1978 | Ohte et al. |
| 4,322,976 A | 4/1982 | Sisson et al. |
| 4,337,516 A | 6/1982 | Murphy et al. |
| 4,408,285 A | 10/1983 | Sisson et al. |
| 4,425,798 A | 1/1984 | Nagai et al. |
| 4,435,770 A | 3/1984 | Shiohata et al. |
| 4,493,042 A | 1/1985 | Shima et al. |
| 4,517,468 A | 5/1985 | Kemper et al. |
| 4,527,271 A | 7/1985 | Hallee et al. |
| 4,530,234 A | 7/1985 | Cullick et al. |
| 4,607,325 A | 8/1986 | Horn |
| 4,635,214 A | 1/1987 | Kasai et al. |
| 4,642,782 A | 2/1987 | Kemper et al. |
| 4,644,478 A | 2/1987 | Stephens et al. |
| 4,644,749 A | 2/1987 | Somes |
| 4,649,515 A | 3/1987 | Thompson et al. |
| 4,657,179 A | 4/1987 | Aggers et al. |
| 4,683,542 A | 7/1987 | Taniguti et al. |
| 4,707,796 A | 11/1987 | Calabro et al. |
| 4,734,873 A | 3/1988 | Malloy et al. |
| 4,758,964 A | 7/1988 | Bittner et al. |
| 4,763,243 A | 8/1988 | Barlow et al. |
| 4,764,862 A | 8/1988 | Barlow et al. |
| 4,770,543 A | 9/1988 | Burghoff et al. |
| 4,777,585 A | 10/1988 | Kokawa et al. |
| 4,819,233 A | 4/1989 | Delucia et al. |
| 4,831,564 A | 5/1989 | Suga et al. |
| 4,843,557 A | 6/1989 | Ina et al. |
| 4,853,175 A | 8/1989 | Book, Sr. |
| 4,873,655 A | 10/1989 | Kondraske |
| 4,885,694 A | 12/1989 | Pray et al. |
| 4,885,707 A | 12/1989 | Nichol et al. |
| 4,907,167 A | 3/1990 | Skeirik |
| 4,910,691 A | 3/1990 | Skeirik |
| 4,922,412 A | 5/1990 | Lane et al. |
| 4,924,418 A | 5/1990 | Bachman et al. |
| 4,934,196 A | 6/1990 | Romano |
| 4,942,514 A | 7/1990 | Miyagaki et al. |
| 4,944,035 A | 7/1990 | Roger et al. |
| 4,956,793 A | 9/1990 | Bonne et al. |
| 4,964,125 A | 10/1990 | Kim |
| 4,965,742 A | 10/1990 | Skeirik |
| 4,980,844 A | 12/1990 | Demjanenko et al. |
| 4,992,965 A | 2/1991 | Holter et al. |
| 5,005,142 A | 4/1991 | Lipchak et al. |
| 5,006,992 A | 4/1991 | Skeirik |
| 5,008,810 A | 4/1991 | Kessel et al. |
| 5,015,934 A | 5/1991 | Holley et al. |
| 5,018,215 A | 5/1991 | Nasr et al. |
| 5,043,862 A | 8/1991 | Takahashi et al. |
| 5,043,863 A | 8/1991 | Bristol et al. |
| 5,050,095 A | 9/1991 | Samad |
| 5,053,815 A | 10/1991 | Wendell |
| 5,070,458 A | 12/1991 | Gilmore et al. |
| 5,081,598 A | 1/1992 | Bellows et al. |
| 5,089,978 A | 2/1992 | Lipner et al. |
| 5,089,984 A | 2/1992 | Struger et al. |
| 5,094,107 A | 3/1992 | Schoch |
| 5,098,197 A | 3/1992 | Shepard et al. |
| 5,099,436 A | 3/1992 | McCown et al. |
| 5,103,409 A | 4/1992 | Shimizu et al. |
| 5,111,531 A | 5/1992 | Grayson et al. |
| 5,121,467 A | 6/1992 | Skeirik |
| 5,122,976 A | 6/1992 | Bellows et al. |
| 5,130,936 A | 7/1992 | Sheppard et al. |
| 5,134,574 A | 7/1992 | Beaverstock et al. |
| 5,140,530 A | 8/1992 | Guha et al. |
| 5,142,612 A | 8/1992 | Skeirik |
| 5,148,378 A | 9/1992 | Shibayama et al. |
| 5,161,013 A | 11/1992 | Rylander et al. |
| 5,163,151 A | 11/1992 | Bronikowski et al. |
| 5,167,009 A | 11/1992 | Skeirik |
| 5,175,678 A | 12/1992 | Frerichs et al. |
| 5,187,674 A | 2/1993 | Boone |
| 5,189,232 A | 2/1993 | Shabtai et al. |
| 5,193,143 A | 3/1993 | Kaemmerer et al. |
| 5,197,114 A | 3/1993 | Skeirik |
| 5,197,328 A | 3/1993 | Fitzgerald |
| 5,200,028 A | 4/1993 | Tatsumi et al. |
| 5,200,958 A | 4/1993 | Hamilton et al. |
| 5,210,704 A | 5/1993 | Husseiny |
| 5,212,765 A | 5/1993 | Skeirik |
| 5,214,582 A | 5/1993 | Gray |
| 5,224,203 A | 6/1993 | Skeirik |
| 5,228,780 A | 7/1993 | Shepard et al. |
| 5,235,527 A | 8/1993 | Ogawa et al. |
| 5,251,151 A | 10/1993 | Demjanenko et al. |
| 5,265,031 A | 11/1993 | Malczewski |
| 5,265,222 A | 11/1993 | Nishiya et al. |
| 5,274,572 A | 12/1993 | O'Neill et al. |
| 5,282,131 A | 1/1994 | Rudd et al. |
| 5,282,261 A | 1/1994 | Skeirik |
| 5,291,190 A | 3/1994 | Scarola et al. |
| 5,293,585 A | 3/1994 | Morita et al. |
| 5,301,101 A | 4/1994 | MacArthur et al. |
| 5,303,181 A | 4/1994 | Stockton |
| 5,305,230 A | 4/1994 | Matsumoto et al. |
| 5,311,421 A | 5/1994 | Nomura et al. |
| 5,311,447 A | 5/1994 | Bonne |
| 5,311,562 A | 5/1994 | Palosamy et al. |
| 5,315,521 A | 5/1994 | Hanson et al. |
| 5,317,520 A | 5/1994 | Castle |
| 5,325,522 A | 6/1994 | Vaughn |
| 5,327,357 A | 7/1994 | Feinstein et al. |
| 5,329,443 A | 7/1994 | Bonaquist et al. |
| 5,333,240 A | 7/1994 | Matsumoto et al. |
| 5,333,298 A | 7/1994 | Bland et al. |
| 5,347,449 A | 9/1994 | Meyer et al. |
| 5,349,541 A | 9/1994 | Alexandro, Jr. et al. |
| 5,351,184 A | 9/1994 | Lu et al. |
| 5,353,207 A | 10/1994 | Keeler et al. |
| 5,353,315 A | 10/1994 | Scarola et al. |
| 5,361,612 A | 11/1994 | Voiculescu et al. |
| 5,369,599 A | 11/1994 | Sadjadi et al. |
| 5,373,452 A | 12/1994 | Guha |
| 5,384,698 A | 1/1995 | Jelinek |
| 5,384,699 A | 1/1995 | Levy et al. |
| 5,386,373 A | 1/1995 | Keeler et al. |
| 5,390,287 A | 2/1995 | Obata et al. |
| 5,390,326 A | 2/1995 | Shah |
| 5,392,226 A | 2/1995 | Hamilton |
| 5,394,341 A | 2/1995 | Kepner |
| 5,394,543 A | 2/1995 | Hill et al. |
| 5,396,415 A | 3/1995 | Konar et al. |
| 5,398,303 A | 3/1995 | Tanaka |
| 5,400,246 A | 3/1995 | Wilson et al. |
| 5,404,064 A | 4/1995 | Mermelstein et al. |
| 5,408,406 A | 4/1995 | Mathur et al. |
| 5,408,586 A | 4/1995 | Skeirik |
| 5,414,645 A | 5/1995 | Hirano et al. |
| 5,419,197 A | 5/1995 | Ogi et al. |
| 5,430,642 A | 7/1995 | Nakajima et al. |
| 5,440,478 A | 8/1995 | Fisher et al. |
| 5,442,544 A | 8/1995 | Jelinek |
| 5,461,570 A | 10/1995 | Wang et al. |
| 5,467,355 A | 11/1995 | Umeda et al. |
| 5,469,735 A | 11/1995 | Watanabe et al. |
| 5,483,387 A | 1/1996 | Bauhahn et al. |
| 5,485,753 A | 1/1996 | Burns et al. |
| 5,486,920 A | 1/1996 | Killpatrick et al. |
| 5,486,995 A | 1/1996 | Krist et al. |
| 5,486,996 A | 1/1996 | Samad et al. |
| 5,488,697 A | 1/1996 | Kaemmerer et al. |
| 5,489,831 A | 2/1996 | Harris |
| 5,499,188 A | 3/1996 | Kline, Jr. et al. |
| 5,500,941 A | 3/1996 | Gil et al. |
| 5,504,863 A | 4/1996 | Yoshida et al. |
| 5,511,004 A | 4/1996 | Dubost et al. |
| 5,511,442 A | 4/1996 | Tame |
| 5,521,814 A * | 5/1996 | Teran et al. .................. 700/266 |
| 5,521,842 A | 5/1996 | Yamoda |

| Patent No. | Date | Name |
|---|---|---|
| 5,528,510 A | 6/1996 | Kraft |
| 5,533,413 A | 7/1996 | Kobayashi et al. |
| 5,537,310 A | 7/1996 | Tanake et al. |
| 5,541,833 A | 7/1996 | Bristol et al. |
| 5,546,301 A | 8/1996 | Agrawal et al. |
| 5,548,528 A | 8/1996 | Keeler et al. |
| 5,559,690 A | 9/1996 | Keeler et al. |
| 5,561,599 A | 10/1996 | Lu |
| 5,566,065 A | 10/1996 | Hansen et al. |
| 5,570,282 A | 10/1996 | Hansen et al. |
| 5,570,300 A | 10/1996 | Henry et al. |
| 5,572,420 A | 11/1996 | Lu |
| 5,574,638 A | 11/1996 | Lu |
| 5,586,066 A | 12/1996 | White et al. |
| 5,596,704 A | 1/1997 | Geddes et al. |
| 5,598,521 A | 1/1997 | Kilgore et al. |
| 5,600,148 A | 2/1997 | Cole et al. |
| 5,602,757 A | 2/1997 | Haseley et al. |
| 5,602,761 A | 2/1997 | Spoerre et al. |
| 5,604,914 A | 2/1997 | Kabe et al. |
| 5,608,845 A | 3/1997 | Ohtsuka et al. |
| 5,610,339 A | 3/1997 | Haseley et al. |
| 5,623,598 A | 4/1997 | Voigt et al. |
| 5,625,574 A | 4/1997 | Griffiths et al. |
| 5,628,994 A | 5/1997 | Kaper et al. |
| 5,631,825 A | 5/1997 | van Weele et al. |
| 5,640,491 A | 6/1997 | Bhat et al. |
| 5,640,493 A | 6/1997 | Skeirik |
| 5,646,350 A | 7/1997 | Robinson et al. |
| 5,666,297 A | 9/1997 | Britt et al. |
| 5,671,335 A | 9/1997 | Davis et al. |
| 5,671,351 A | 9/1997 | Wild et al. |
| 5,675,504 A | 10/1997 | Serodes et al. |
| 5,680,409 A | 10/1997 | Qin et al. |
| 5,682,309 A | 10/1997 | Bartusiak et al. |
| 5,687,090 A | 11/1997 | Chen et al. |
| 5,691,895 A | 11/1997 | Kurtzberg et al. |
| 5,692,158 A | 11/1997 | Degeneff et al. |
| 5,698,788 A | 12/1997 | Mol et al. |
| 5,704,011 A | 12/1997 | Hansen et al. |
| 5,715,158 A | 2/1998 | Chen |
| 5,729,661 A | 3/1998 | Keeler et al. |
| 5,740,324 A | 4/1998 | Mathur et al. |
| 5,742,513 A | 4/1998 | Bouhenguel et al. |
| 5,754,451 A | 5/1998 | Williams |
| 5,757,371 A | 5/1998 | Oran et al. |
| 5,761,518 A | 6/1998 | Boehling et al. |
| 5,764,891 A | 6/1998 | Warrior |
| 5,768,119 A | 6/1998 | Havekost et al. |
| 5,777,872 A | 7/1998 | He |
| 5,781,432 A | 7/1998 | Keeler et al. |
| 5,781,878 A | 7/1998 | Mizoguchi et al. |
| 5,790,898 A | 8/1998 | Kishima et al. |
| 5,796,602 A | 8/1998 | Wellan et al. |
| 5,796,606 A | 8/1998 | Spring et al. |
| 5,796,609 A | 8/1998 | Tao et al. |
| 5,798,939 A | 8/1998 | Ochoa et al. |
| 5,805,442 A | 9/1998 | Crater et al. |
| 5,809,490 A | 9/1998 | Guiver et al. |
| 5,819,050 A | 10/1998 | Boehling et al. |
| 5,819,232 A | 10/1998 | Shipman |
| 5,825,645 A | 10/1998 | Konar et al. |
| 5,826,249 A | 10/1998 | Skeirik |
| 5,838,561 A | 11/1998 | Owen |
| 5,842,189 A | 11/1998 | Keeler et al. |
| 5,847,952 A | 12/1998 | Samad |
| 5,848,365 A | 12/1998 | Coverdill |
| 5,855,791 A | 1/1999 | Hays et al. |
| 5,859,773 A | 1/1999 | Keeler et al. |
| 5,859,885 A | 1/1999 | Rusnica et al. |
| 5,859,964 A | 1/1999 | Wang et al. |
| 5,875,420 A | 2/1999 | Piety et al. |
| 5,877,954 A | 3/1999 | Klimasauskas et al. |
| 5,880,716 A | 3/1999 | Kunugi et al. |
| 5,892,679 A | 4/1999 | He |
| 5,892,939 A | 4/1999 | Call et al. |
| 5,898,869 A | 4/1999 | Anderson |
| 5,901,058 A | 5/1999 | Steinman et al. |
| 5,903,455 A | 5/1999 | Sharpe, Jr. et al. |
| 5,905,989 A | 5/1999 | Biggs |
| 5,906,214 A | 5/1999 | Gueret et al. |
| 5,907,701 A | 5/1999 | Hanson |
| 5,909,370 A | 6/1999 | Lynch |
| 5,909,541 A | 6/1999 | Sampson et al. |
| 5,909,586 A | 6/1999 | Anderson |
| 5,914,875 A | 6/1999 | Monta et al. |
| 5,918,233 A | 6/1999 | La Chance et al. |
| 5,922,963 A | 7/1999 | Piety et al. |
| 5,924,086 A | 7/1999 | Mathur et al. |
| 5,940,290 A | 8/1999 | Dixon |
| 5,948,101 A | 9/1999 | David et al. |
| 5,949,417 A | 9/1999 | Calder |
| 5,951,654 A | 9/1999 | Avsan et al. |
| 5,960,214 A | 9/1999 | Sharpe, Jr. et al. |
| 5,960,441 A | 9/1999 | Bland et al. |
| 5,975,737 A | 11/1999 | Crater et al. |
| 5,984,502 A | 11/1999 | Calder |
| 5,988,847 A | 11/1999 | McLaughlin et al. |
| 5,995,916 A | 11/1999 | Nixon et al. |
| 5,997,167 A | 12/1999 | Crater et al. |
| 6,006,171 A | 12/1999 | Vines et al. |
| 6,008,985 A | 12/1999 | Lake et al. |
| 6,014,612 A | 1/2000 | Larson et al. |
| 6,017,143 A | 1/2000 | Eryurek et al. |
| 6,026,352 A | 2/2000 | Burns et al. |
| 6,033,257 A | 3/2000 | Lake et al. |
| 6,035,339 A | 3/2000 | Agraharam et al. |
| 6,038,486 A | 3/2000 | Saitoh et al. |
| 6,038,540 A | 3/2000 | Krist et al. |
| 6,041,263 A | 3/2000 | Boston et al. |
| 6,047,220 A | 4/2000 | Eryurek |
| 6,047,221 A | 4/2000 | Piche et al. |
| 6,055,483 A | 4/2000 | Lu |
| 6,061,603 A | 5/2000 | Papadopoulos et al. |
| 6,067,505 A | 5/2000 | Bonoyer et al. |
| 6,076,124 A | 6/2000 | Korowitz et al. |
| 6,078,843 A | 6/2000 | Shavit |
| 6,093,211 A | 7/2000 | Hamielec et al. |
| 6,106,785 A | 8/2000 | Haviena et al. |
| 6,108,616 A | 8/2000 | Borchers et al. |
| 6,110,214 A | 8/2000 | Kiimasaukas |
| 6,119,047 A | 9/2000 | Eryurek et al. |
| 6,122,555 A | 9/2000 | Lu |
| 6,128,279 A | 10/2000 | O'Neil et al. |
| 6,134,574 A | 10/2000 | Oberman et al. |
| 6,144,952 A | 11/2000 | Keeler et al. |
| 6,169,980 B1 | 1/2001 | Keeler et al. |
| 6,185,470 B1 | 2/2001 | Pado et al. |
| 6,197,480 B1 | 3/2001 | Iguchi et al. |
| 6,246,972 B1 | 6/2001 | Klimasauskas |
| 6,259,959 B1 | 7/2001 | Martin |
| 6,266,726 B1 | 7/2001 | Nixon et al. |
| 6,298,377 B1 | 10/2001 | Hartikainen et al. |
| 6,298,454 B1 | 10/2001 | Schleiss et al. |
| 6,317,638 B1 | 11/2001 | Schreder et al. |
| 6,317,701 B1 | 11/2001 | Pyotsia et al. |
| 6,332,110 B1 | 12/2001 | Wolfe |
| 6,389,331 B1 | 5/2002 | Jensen et al. |
| 6,397,114 B1 | 5/2002 | Eryurek |
| 6,400,681 B1 | 6/2002 | Bertin et al. |
| 6,418,465 B1 | 7/2002 | Hirosawa et al. |
| 6,421,571 B1 | 7/2002 | Spriggs et al. |
| 6,434,435 B1 | 8/2002 | Tubel et al. |
| 6,443,435 B1 | 9/2002 | Hendrickson |
| 6,445,963 B1 | 9/2002 | Blevins et al. |
| 6,507,797 B1 | 1/2003 | Kliman et al. |
| 6,529,780 B1 | 3/2003 | Soergel et al. |
| 6,532,392 B1 | 3/2003 | Eryurek et al. |
| 6,535,769 B1 | 3/2003 | Konar et al. |
| 6,539,267 B1 | 3/2003 | Eryurek et al. |
| 6,549,130 B1 | 4/2003 | Joao |
| 6,567,718 B1 | 5/2003 | Campbell et al. |
| 6,571,273 B1 | 5/2003 | Shirai et al. |
| 6,591,260 B1 | 7/2003 | Schwarzhoff et al. |
| 6,609,040 B1 | 8/2003 | Brunnemann et al. |
| 6,615,090 B1 | 9/2003 | Blevins et al. |
| 6,628,994 B1 | 9/2003 | Turicchi, Jr. et al. |
| 6,633,782 B1 | 10/2003 | Schleiss et al. |

| | | | |
|---|---|---|---|
| 6,651,012 B1 | 11/2003 | Bechhoefer | |
| 6,654,697 B1 | 11/2003 | Eryurek et al. | |
| 6,681,155 B1 | 1/2004 | Fujita et al. | |
| 6,690,274 B1 | 2/2004 | Bristol | |
| 6,704,689 B1 | 3/2004 | Hogan et al. | |
| 6,717,513 B1 | 4/2004 | Sandelman et al. | |
| 6,721,609 B1 | 4/2004 | Wojsznis | |
| 6,732,191 B1 | 5/2004 | Baker et al. | |
| 6,738,388 B1 | 5/2004 | Stevenson et al. | |
| 6,758,168 B2 | 7/2004 | Koskinen et al. | |
| 6,760,782 B1 | 7/2004 | Swales | |
| 6,774,786 B1 * | 8/2004 | Havekost et al. | 340/517 |
| 6,965,855 B1 | 11/2005 | Burbridge et al. | |
| 6,968,389 B1 | 11/2005 | Menditto et al. | |
| 7,079,984 B2 | 7/2006 | Eryurek et al. | |
| 7,120,917 B2 | 10/2006 | Feist | |
| 7,206,646 B2 | 4/2007 | Nixon et al. | |
| 7,720,727 B2 | 5/2010 | Keyes et al. | |
| 2002/0022894 A1 | 2/2002 | Eryurek et al. | |
| 2002/0029130 A1 | 3/2002 | Eryurek et al. | |
| 2002/0038156 A1 | 3/2002 | Eryurek et al. | |
| 2002/0067370 A1 | 6/2002 | Forney et al. | |
| 2002/0077711 A1 | 6/2002 | Nixon et al. | |
| 2002/0147511 A1 | 10/2002 | Eryurek et al. | |
| 2002/0156838 A1 | 10/2002 | Batke et al. | |
| 2002/0161940 A1 | 10/2002 | Eryurek et al. | |
| 2002/0163427 A1 | 11/2002 | Eryurek et al. | |
| 2002/0199014 A1 | 12/2002 | Yang et al. | |
| 2003/0002969 A1 | 1/2003 | Risser | |
| 2003/0009572 A1 | 1/2003 | Thurner | |
| 2003/0014500 A1 | 1/2003 | Schleiss et al. | |
| 2003/0028268 A1 | 2/2003 | Eryurek et al. | |
| 2003/0065409 A1 | 4/2003 | Raeth et al. | |
| 2003/0195934 A1 | 10/2003 | Peterson et al. | |
| 2003/0236579 A1 | 12/2003 | Hauhia et al. | |
| 2004/0075689 A1 | 4/2004 | Schleiss et al. | |
| 2004/0095237 A1 | 5/2004 | Chen et al. | |
| 2004/0181364 A1 | 9/2004 | Reeves et al. | |
| 2004/0249583 A1 | 12/2004 | Eryurek et al. | |
| 2005/0007249 A1 | 1/2005 | Eryurek et al. | |
| 2005/0015624 A1 | 1/2005 | Ginter et al. | |
| 2005/0240289 A1 | 10/2005 | Hoyte et al. | |

FOREIGN PATENT DOCUMENTS

| | | |
|---|---|---|
| CN | 1267373 | 9/2000 |
| DE | 35 40 204 | 9/1986 |
| DE | 40 08 560 | 9/1990 |
| DE | 44 33 593 | 6/1995 |
| DE | 195 02 499 | 8/1996 |
| DE | 199 62 230 A1 | 6/2001 |
| EP | 0 122 622 | 10/1984 |
| EP | 0 362 386 | 4/1990 |
| EP | 0 377 736 | 7/1990 |
| EP | 0 413 814 | 2/1991 |
| EP | 0 487 419 A2 | 5/1992 |
| EP | 0 594 227 | 4/1994 |
| EP | 0 612 039 | 8/1994 |
| EP | 0 624 847 | 11/1994 |
| EP | 0 626 697 | 11/1994 |
| EP | 0 644 470 | 3/1995 |
| EP | 0 827 096 | 3/1998 |
| EP | 0 959 398 | 11/1999 |
| EP | 0 961 184 | 12/1999 |
| EP | 0 964 325 | 12/1999 |
| EP | 0 965 897 | 12/1999 |
| EP | 1 160 691 A2 | 12/2001 |
| GB | 2 083 258 A | 3/1982 |
| GB | 2 294 129 | 4/1996 |
| GB | 2 294 793 | 5/1996 |
| GB | 2 347 234 | 8/2000 |
| GB | 2 380 833 | 4/2003 |
| GB | 2 404 457 A | 2/2005 |
| JP | 02-197902 | 8/1990 |
| JP | 4-220521 | 8/1992 |
| JP | 05-122853 | 5/1993 |
| JP | 05-149763 A | 6/1993 |
| JP | 6-121379 A | 4/1994 |
| JP | 06-125584 A | 5/1994 |
| JP | 06-242192 | 9/1994 |
| JP | 06-331507 | 12/1994 |
| JP | 07-234988 | 9/1995 |
| JP | 8-249054 A | 9/1996 |
| JP | 08-261886 | 10/1996 |
| JP | 09-200262 | 7/1997 |
| JP | 10-039728 | 2/1998 |
| JP | 10-260821 | 9/1998 |
| JP | 10-320039 | 12/1998 |
| JP | 11-231924 | 8/1999 |
| JP | 11-355325 A | 12/1999 |
| JP | 2000-067015 | 3/2000 |
| JP | 2000-078750 A | 3/2000 |
| JP | 2000-137504 A | 5/2000 |
| JP | 2000-172329 A | 6/2000 |
| JP | 2000-305620 | 11/2000 |
| JP | 2001-016662 | 1/2001 |
| JP | 2001-022430 | 1/2001 |
| JP | 2001-044997 A | 2/2001 |
| JP | 2001-216423 A | 8/2001 |
| JP | 2001-265821 A | 9/2001 |
| JP | 2001-350507 A | 12/2001 |
| JP | 2002-315082 A | 10/2002 |
| JP | 2002-323922 A | 11/2002 |
| JP | 2003-058206 A | 2/2003 |
| RU | 94-030327 | 6/1996 |
| RU | 2103668 | 1/1998 |
| RU | 2114456 | 6/1998 |
| RU | 2154853 | 8/2000 |
| RU | 2178578 | 1/2002 |
| WO | WO-98/38585 | 9/1998 |
| WO | WO-99/13418 | 3/1999 |
| WO | WO-00/50851 | 8/2000 |
| WO | WO-01/08054 A2 | 2/2001 |
| WO | WO-02/23405 | 3/2002 |
| WO | WO-02/095633 | 11/2002 |
| WO | WO-03/019304 A1 | 3/2003 |
| WO | WO-03/075206 A2 | 9/2003 |
| WO | WO-2004/068026 A2 | 8/2004 |

OTHER PUBLICATIONS

"Components of GE Predictor™ Services," GE Industrial Systems, available at http://www.geindustrial.com/cwc/services?id=74 on Jul. 18, 2002.

"Customer Benefits," GE Industrial Systems, available at http://www.geindustrial.com/cwc/services?id=75 on Jul. 18, 2002.

"Customer Impact," GE Industrial Systems, available at http://www.geindustrial.com/cwc/services?id=73 on Jul. 18, 2002.

"Electrical Equipment Coverage," GE Industrial Systems, available at http://www.geindustrial.com/cwc/services?id=72 on Jul. 18, 2002.

"GE Predictor™ Services: GE Predictor Services Overview," GE Industrial Systems, available at http://www.geindustrial.com/cwc/services?id=71 on Jul. 18, 2002.

"Status Signals of Field Instruments," NAMUR Recommendation, NA 64, Feb. 1, 2001, pp. 1-8.

Bray et al., "Practical Alarm Filtering," *Intech*, 41 (2):34-36 (1994).

Communication Pursuant to Article 96(2) EPC issued in 02 719 088.3-2206 application by the European Patent Office on Sep. 29, 2004.

Communication pursuant to Article 96(2) EPC issued in 02 723 258.6-2206 application by the European Patent Office on Sep. 28, 2004.

Dayal et al., "Process Coordination: State of the Art, Trends, and Open Issues," *Proceedings of the 27th International Conference on Very Large Data Bases*, pp. 3-13 (2001).

dotnet.za.net, "Web Services—A Guide for Business and IT Managers (Sep. 23, 2001)", (Copyright 2001), www.dotnet.za.net.

European Examination Report for Application No. 05714115.2, dated Nov. 5, 2010.

European Examination Report for Application No. 02717514.0, dated Jun. 29, 2004.

European Examination Report for Application No. 02723319.6, dated Jul. 1, 2004.

European Examination Report for Application No. 03743708, dated Feb. 2, 2010.

Examination Report for Application No. GB 0212610.0, dated Sep. 16, 2004.
Examination Report for Application No. GB 0308687.3, dated Mar. 11, 2005.
Examination Report for Application No. GB 0308687.9, dated Mar. 11, 2005.
Examination Report for Application No. GB 0416908.2, dated Jun. 27, 2006.
First Office Action issued in Chinese Application No. 02122060.3 on Feb. 4, 2005.
First Office Action issued in Chinese Application No. 02805785.6 on Nov. 11, 2005.
First Office Action issued in Chinese Application No. 02805854.2 on Nov. 11, 2005.
First Office Action issued in Chinese Application No. 200580006879.X on Jan. 25, 2008.
First Office Action issued in Russian Application No. 2006133968/09, dated May 6, 2009.
Fritch W., Primenenie mikroprocessorov v sistemah upravleniya, Moskwa, Mir, 1984 (D1, pp. 68-74).
Graupner et al., "E-Speak: An Enabling Infrastructure for Web-Based E-Services," Proceedings of International Conferences on Advances in Infrastructure for Electronic Business (2000). Retrieved from the Internet: URL:http://yangtze.cs.uiuc.edu/~wooyoung/espeak-ssgrr.pdf.
International Preliminary Examination Report for Application No. PCT/US02/15901, dated Sep. 10, 2003.
International Preliminary Examination Report for Application No. PCT/US05/00155, dated Sep. 5, 2006.
International Preliminary Examination Report for Application No. PCT/US05/00319. dated Sep. 5, 2006.
International Preliminary Examination Report for Application No. PCT/US05/00325, dated Sep. 5, 2006.
International Preliminary Examination Report for Application No. PCT/US02/05874, dated Feb. 3, 2003.
International Search Report and Written Opinion for Application No. PCT/US02/15901, dated Jun. 17, 2003.
International Search Report and Written Opinion for Application No. PCT/US05/00319, dated Sep. 16, 2005.
International Search Report and Written Opinion for Application No. PCT/US05/00325, dated Sep. 5, 2005.
International Search Report and Written Opinion for Application No. PCT/US05/06155, dated Sep. 5, 2005.
International Search Report and Written Opinion for Application No. PCT/US02/05874, dated Nov. 13, 2002.
Kalkhoff, "Agent-Oriented Robot Task Transformation," Proceedings of the International Symposium on Intelligent Control, IEEE, pp. 242-247 (Aug. 27, 1995).
Kim et al., "Web E-Speak: Facilitating Web-Based E-Services," Multimedia, IEEE 9(1):43-55 (2002).
Kuno et al., "My Agent Wants to Talk to Your Service: Personalizing Web Services Through Agents," *Proceedings of the First International Workshop on Challenges in Open Agent Systems* (2002). Retrieved from the Internet on Apr. 22, 2010: URL:http://www.hpl.hp.com/techreports/2002/HPL-2002-114.pdf.
Lighthammer Illuminator™ Manufacturing Intelligence Brochure "Now you can see all your manufacturing information from a single interface—in real-time, from anywhere."
Lighthammer Software Development, "Illuminator™ The 1st 'Plant Information Portal'™" (Copyright 1999).
Mazeda et al., "Supervision and Optimised Process Control in Sugar Beet Factories," Centre of Sugar Technology, Spain from www.univ-reims.fr/externes/avh10mazaeda.pdf.
Mehta et al., "Feedforward Neural Networks for Process Identification and Prediction," presented at ISA 2001, Houston, Texas, Sep. 2001.
Moskwa, Mir, A method for gathering data associated with a process plant is known from Fritch W. Primenenie mikroprocesssorov v sistemah upravleniya, (1994).

Namur Worksheet, "Status Signals of Field Instruments," NA 64, Feb. 1, 2001, pp. 1-8.
Notice of Allowance U.S. Appl. No. 10/971,361, dated Feb. 27, 2006.
Notice of Reasons for Rejection for Japanese Application No. 2003-145503, dated Dec. 11, 2007.
Notice of Reasons for Rejection for Japanese Application No. 2003-573590, dated Dec. 1, 2009.
Notice of Reasons for Rejection for Japanese Application No. 2008-17965, dated Nov. 9, 2010.
Notice of Reasons for Rejection for Japanese Application No. 2002-570030, dated Jun. 19, 2007.
Notice of Reasons for Rejection for Japanese Application No. 2002-591920, dated Jun. 12, 2007.
Notice of Reasons for Rejection for Japanese Application No. 2003-573590, dated Dec. 9, 2008.
Office Action for related Russian Application No. 2006133970/09(036945), dated Jun. 11, 2009.
Office Action for U.S. Appl. No. 10/971,361, dated Sep. 26, 2005.
Parker et al., Distribution System for Structured Information (2001).
Partial International Search Report for PCT/US2005/006325 mailed Jul. 8, 2005.
Russian examiner's Decision on Grant and English translation thereof.
Search Report for Application No. GB 0308687.3, dated Aug. 28, 2003.
Search Report for Application No. GB 0308687.9, dated Aug. 28, 2003.
Search Report for Application No. GB 0416908.2, dated Oct. 13, 2004.
Second Office Action for Chinese Application No. 03110485.1, dated Oct. 26, 2007.
Second Office Action for Chinese Application No. 200580006879.X, dated Sep. 12, 2008.
Second Office Action for Russian Application No. 2006133970/09(036945), dated Nov. 9, 2009.
Sheldon et al., "Discover: A Resource Discovery System Based on Content Routing," Proc. 3rd International World Wide Web Conference (1995).
Supplementary European Search Report for Application No. 03743708, dated Oct. 8, 2009.
Systinet, "Introduction to Web Services", (Copyright 2001, 2002), www.systinet.com.
Third Office Action for Chinese Application No. 200410103816.3, dated Nov. 7, 2009.
Tzovla et al., "Abnormal Condition Management Using Expert Systems," presented at ISA 2001, Houston, Texas, Sep. 2001.
U.S. Appl. No. 60/273,164, filed Mar. 1, 2001, "Asset Utilization Expert in a Process Control Plant."
U.S. Appl. No. 60/491,066, filed Jul. 20, 2003, "Economic Calculations in a Process Control System."
Web Services Architect, "What are Web Services", www.webservicesarchitect.com.
Notice of Rejection for Japanese Application No. 2004-219552, dated May 13, 2010.
English-language Machine Translation of JP-2002-323922-A.
English-language Machine Translation of JP-2003-058206-A.
Questioning for Japanese Appeal No. 2011-19471, mailed Nov. 29, 2011.
English-language translation of First Office Action for Chinese Application No. 2010102701455.
Decision of Rejection for Japanese Application No. 2009-1227, dated Feb. 28, 2012.
Questioning for Japanese Appeal No. 2012-9863, mailed Aug. 28, 2012.
Office Action for Japanese Application No. 2012-9863, dated Dec. 18, 2012.
Office Action for Japanese Application No. 2011-173168, dated Dec. 25, 2012.

* cited by examiner

ECONOMIC CALCULATIONS IN A PROCESS CONTROL SYSTEM

RELATED APPLICATIONS

This is a divisional application of U.S. patent application Ser. No. 10/798,101, entitled "Economic Calculations in a Process Control System" (filed on Mar. 11, 2004) which claims the benefit of U.S. Provisional Patent Application No. 60/491,066 (filed on Jul. 30, 2003) and which is a continuation-in-part of U.S. patent application Ser. No. 10/123,445, entitled "Web-Services Based Communications for Use With Process Control Systems," (filed on Apr. 15, 2002), and which is also a continuation-in-part of U.S. patent application Ser. No. 09/953,811, entitled "Fusion of Process Performance Monitoring with Process Equipment Monitoring and Control" (filed on Sep. 17, 2001), which claims the benefit under 35 U.S.C. §119(e) of U.S. Provisional Application Ser. No. 60/273,164, entitled "Asset Utilization Expert in a Process Control Plant" (filed Mar. 1, 2001). The entire disclosure of each of these applications is hereby expressly incorporated by reference herein.

TECHNICAL FIELD

This invention relates generally to process control systems and, more particularly, to the use of economic calculations to facilitate and provide better control of a process or plant.

DESCRIPTION OF THE RELATED ART

Process control systems, like those used in chemical, petroleum or other processes, typically include one or more centralized process controllers communicatively coupled to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, uses this information to implement a control routine and then generates control signals which are sent over the buses or other communication lines to the field devices to control the operation of the process. Information from the field devices and the controllers may be made available to one or more applications executed by the operator workstation to enable an operator to perform desired functions with respect to the process, such as viewing the current state of the process, modifying the operation of the process, etc.

Typically, a process control system operates within a business enterprise that may include several process control plants, component and/or service suppliers and customers, all of which may be distributed throughout a large geographic area, or in some cases, throughout the world. The process control plants, suppliers and customers may communicate with each other using a variety of communication media and technologies or platforms such as, for example, the Internet, satellite links, ground-based wireless transmissions, telephone lines, etc. Of course, the Internet has become a preferred communication platform for many business enterprises because the communications infrastructure is already established, making the communication infrastructure costs for an enterprise near zero, and the technologies used to communicate information via the Internet are well-understood, stable, secure, etc.

A process plant within an enterprise may include one or more process control systems as well as a number of other business-related or information technology systems, which are needed to support or maintain or which are used to effect the operation of the process plant. In general, the information technology systems within a process plant may include manufacturing execution systems such as, for example, a maintenance management system and may also include enterprise resource planning systems such as, for example, scheduling, accounting and procurement systems. Although these information technology systems may be physically located within or near a plant, in some cases a few or possibly all of these systems may be remotely located with respect to the plant and may communicate with the plant using the Internet or any other suitable communication link.

Each process plant may also include user-interactive applications that may be executed on a server or workstation that is communicatively coupled to one or more servers, workstations, or other computers that coordinate or perform the activities of the process control system within the plant. Such user-interactive applications may perform campaign management functions, historical data management functions, asset management functions, batch management functions, diagnostics functions, etc. In addition, each of the process control systems within a plant may include process management applications that may, for example, manage the communications of and provide information relating to alarm and/or other process events, provide information or data relating to the condition of the process or processes being performed by the process plant, provide information or data relating to the condition or performance of equipment associated with the process control plant, etc. In particular, process management applications may include vibration monitoring applications, real-time optimization applications, expert system applications, predictive maintenance applications, control loop monitoring applications, or any other applications related to controlling, monitoring and/or maintaining a process control system or plant. Still further, a process plant or enterprise may include one or more communication applications that may be used to communicate information from the process control system or plant to a user via a variety of different communication media and platforms. For example, these communication applications may include e-mail applications, paging applications, voice messaging applications, file-based applications, etc., all of which may be adapted to send information via a wireless or hardwired media to a desktop computer, a laptop computer, a personal data assistant, a cellular phone or pager, or any other type of device or hardware platform.

Despite the complex information technology systems now typically associated with process plants and the vast array of data associated therewith, the methods of controlling plants in order to optimize plant output have been typically based on the same principles, namely, increasing throughput of the plant within certain quality limits. While there is traditionally an attempt to run the plant optimally from a profit or economic standpoint, it has been difficult to do so because the profit analysis has been performed using financial and accounting information and other data that is, at best, backward looking. For example profitability, costs, inventories, operating efficiencies, waste, scrap, quality, and other industrial management information is often reported in aggregate as much as two weeks to a month after the relevant performance. As a result, this information is not available in a time correlated manner or integrated with other measurements and analyses or external environmental, market factors or information. Thus, current plant control methodology provides little or no support for on-line or up-to-the-minute process or business management and the concept of closed loop control and optimization of any part or aspect of the entities being managed is lacking.

SUMMARY

A process control system includes economic models disposed in communication with process control modules, as well as with sources of economic data and uses the economic models to determine useful economic parameters or information associated with the actual operation of the process plant at the time the plant is operating. The economic models can be used to provide financial statistics such as profitability, cost of manufactured product, etc. in real time based on the actual current operating state of the process and the business data associated with the finished product, raw materials, etc. These financial statistics can be used to drive alarms and alerts within the process network and be used as inputs to process plant optimizers, etc. to provide for better or more optimal control of the process and to provide a better understanding of the conditions which lead to maximum profitability of the plant.

DESCRIPTION

Figure 1:
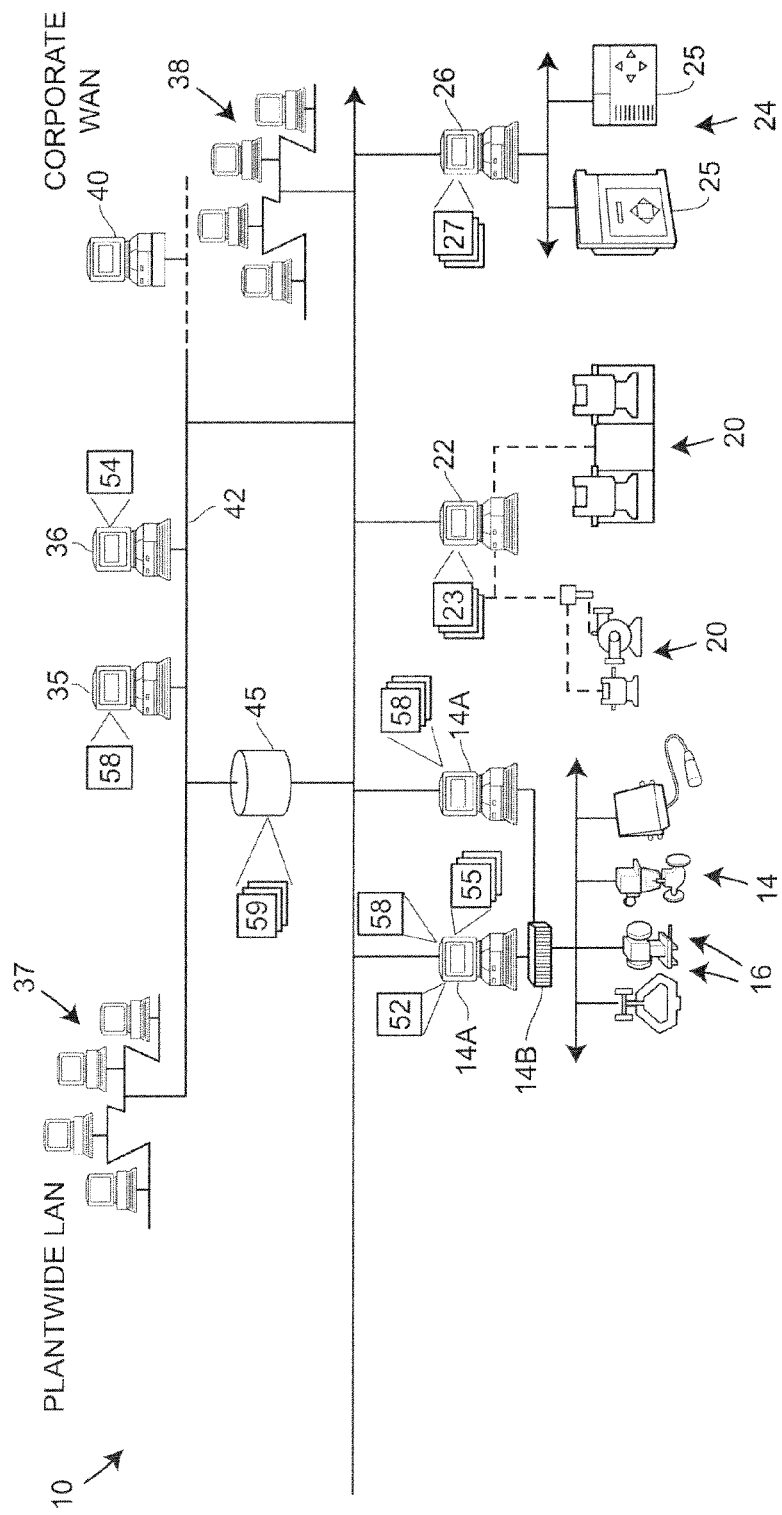
FIG. 1 is a block diagram of a process plant having a process control system, process equipment monitoring system and business systems communicatively interconnected to provide for on-line financial calculations and analysis within the plant.

Referring now to FIG. 1, a process control plant 10 includes a number of business and other computer systems interconnected with a number of control and maintenance systems by one or more communication networks. The process control plant 10 illustrated in FIG. 1 includes one or more process control systems 14 which may be, for example, distributed process control systems or any other desired type of process control systems. The process control system 14 includes one or more operator interfaces 14A coupled to one or more distributed controllers 14B via a bus, such as an Ethernet bus. The controllers 14B may be, for example, DeltaV™ controllers sold by Emerson Process Management or any other desired type of controllers. The controllers 14B are connected via I/O devices to one or more field devices 16, such as for example, HART or FOUNDATION Fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools available to the process control operator for controlling the operation of the process including, for example, control optimizers, diagnostic experts, neural networks, tuners, etc.

Still further, maintenance systems, such as computers executing the AMS (Asset Management Solutions) system sold by Emerson Process Management or any other device or equipment monitoring and communication applications may be connected to the process control system 14 or to the individual devices therein to perform maintenance and monitoring activities. For example, maintenance applications such as the AMS application may be installed in and executed by one or more of the user interfaces 14A associated with the distributed process control system 14 to perform maintenance and monitoring functions, including data collection related to the operating status of the devices 16. Of course these maintenance applications may be implemented in other computers or interfaces within the process plant 10.

The process control plant 10 also includes various rotating equipment 20, such as turbines, motors, etc. which are connected to a maintenance computer 22 via a permanent or temporary communication link (such as a bus, a wireless communication system or hand held devices which are connected to the equipment 20 to take readings and are then removed). The maintenance computer 22 may store and execute known monitoring and diagnostic applications 23 provided by, for example, CSi Systems or any other known applications used to diagnose, monitor and optimize the operating state of the rotating equipment 20. Maintenance personnel usually use the applications 23 to maintain and oversee the performance of rotating equipment 20 in the plant 10, to determine problems with the rotating equipment 20 and to determine when and if the rotating equipment 20 must be repaired or replaced. In some cases, outside consultants or service organizations may temporarily acquire or measure data pertaining to the equipment 20 and use this data to perform analyses for the equipment 20 to detect problems, poor performance or other issues effecting the equipment 20. In these cases, the computers running the analyses may not be connected to the rest of the system 10 via any communication line or may be connected only temporarily.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such as those provided by, for example, Liebert and ASCO or other service companies to control and maintain the power generation and distribution equipment 25. Again, in many cases, outside consultants or service organizations may temporarily acquire or measure data pertaining to the equipment 25 and use this data to perform analyses for the equipment 25 to detect problems, poor performance or other issues effecting the equipment 25. In these cases, the computers (such as the computer 26) running the analyses may be connected to the rest of the system 10 via a communication line or may be connected only temporarily.

As illustrated in FIG. 1, the plant 10 may also include business system computers and maintenance planning computers 35 and 36, which may execute, for example, enterprise resource planning (ERP), material resource planning (MRP), process modeling for performance modeling, accounting, production and customer ordering systems, maintenance planning systems or any other desired business applications such as parts, supplies and raw material ordering applications, production scheduling applications, etc. A plantwide LAN 37, a corporate WAN 38 and a computer system 40 that enables remote monitoring of or communication with the plant 10 from remote locations may be connected to the business systems 35 and 36 via a communications bus 42.

Of course, any other equipment and process control devices could be attached to or be part of the plant 10 and the system described herein is not limited to the equipment specifically illustrated in FIG. 1 but can, instead or in addition, include any other types of process control equipment or devices, business systems, data collection systems, etc.

As illustrated in FIG. 1, a computer system 45 may be communicatively connected to the process control and/or maintenance interfaces 14A of the distributed process control system 14, the rotating equipment maintenance computer 22, the power generation and distribution computer 26, and the business systems all via the bus or other communication link 45. The communication system or link 45 may use any desired or appropriate local area network (LAN) or wide area network (WAN) protocol to provide communications. Of course the computer system 45 could be connected to these different parts of the plant 10 via other communication links including fixed or intermittent links, hard-wired or over-the-air links or any physical medium such as one of wired, wireless, coaxial cable, telephone modem, fiber optic, optical, meteor burst, satellite medium using one of a Fieldbus, IEEE 802.3, blue tooth, X.25 or X.400 communication protocol, etc.

In the past, the various process control systems 14 and the business systems 35, 36, etc., have not been interconnected with each other or with business systems in a manner that enables them to share data generated in or collected by each of these systems in a useful manner. As a result, the process control functions have operated on the assumptions that the most profitable operating state of the plant is one which maximizes some variable, such as throughput. In some cases, systems have been operated on a profitability basis that was computed or calculated based on previously measured or acquired data, such as data that may be associated with process operation weeks in the past, and not on data associated with the process as currently operating.

To overcome this problem, certain profit or economic models are created and communicatively coupled to the process control network to perform on-line profitability analyses. The economic models automatically communicate with the process control system to access and use process control data and are configured to automatically receive economic data pertaining to the process control system from business systems or other data sources that, in the past, have not been made available to determine profitability of the process control system on an on-line basis.

The economic models may be provided at any place within the process 10, but are illustrated in FIG. 1 as models 55 within the user interface or other computer 14A of the process control system. Furthermore, a data communication system 59, which is described in more detail herein, is provided in the computer 45 which may be any type of computer system, such as a server. The data communication system 59 is configured to receive financial or other business or profit data from various sources of this data and to automatically provide that data to the economic models 55 within the process control computer 14A. The economic models 55, which may be stand alone models or models integrated in other applications, such as diagnostic or optimization applications, use this data, along with data from the process control system 14 to determine profitability of the plant 10 in an on-line manner.

While the data communication system 59 is illustrated as being provided in the computer 45, it may be provided or implemented at numerous locations throughout the process network 10 to acquire and process data from any source of data such as the controller systems 14, the monitoring systems 22 and 26, the financial systems 35, 36, etc. The data communication system 59 may also acquire data from various other sources of data, such as from PDAs or other hand-held devices or portable computers, from data historians or from any other electronic source of data, especially profit related data, such as that associated with the sales price of goods being manufactured, contract prices and quantities, costs associated with the manufacture of goods, such as the costs of raw materials, power (such as electricity, gas, coal, etc.), overhead costs, plant operating costs, etc.

If the data communication system 59 is located in the computer 45, it may receive data from the disparate sources of data, such as the controllers, equipment monitoring and financial applications separately using different data formats, or using a common format. In one embodiment, the communications over the bus 42 occur using the XML protocol as discussed in more detail below. Here, data from each of the computers 14A, 22, 26, 35, 36, etc. is wrapped in an XML wrapper and is sent to an XML data server which may be located in, for example, the computer 45. Because XML is a descriptive language, the computer 45 can process any type of data. At the computer 45, if necessary, the data is encapsulated and mapped to a new XML wrapper, i.e., this data is mapped from one XML schema to one or more other XML schemas which are created for each of the receiving applications. One method of providing this communication is described in co-pending U.S. application Ser. No. 09/902,201 filed Jul. 10, 2001, entitled "Transactional Data Communications for Process Control Systems" which is assigned to the assignee of this application and which is hereby expressly incorporated by reference herein. With this system, each data originator can wrap its data using a schema understood or convenient for that device or application, and each receiving application can receive the data in a different schema used for or understood by the receiving application. The computer 45 is configured to map one schema to another schema depending on the source and destination(s) of the data. If desired, the computer 45 may also perform certain data processing functions or other functions based on the receipt of data. The mapping and processing function rules are set up and stored in the computer 45 prior to operation of a suite of data integration applications described herein. In this manner, data may be sent from any one application to one or more other applications.

Generally speaking, the goal of the system described herein is to be able to provide accurate and up-to-date profit or other economic calculations to provide better profit information on which to make decisions when controlling the operation of the plant 10. These economic calculations combine process measurements with software components and business transaction services to provide an on-line, real-time financial, accounting, and quality measurement system utilizing data verification, validation, reconciliation, archiving, alarm and support analyses, reports, displays, inquiry and search functions for the process.

An assumption often made during the design of a control strategy is that maximum throughput equals maximum profit. Although this assumption is sometimes true, especially where the process is constrained by a specific piece of equipment, it is not always true. To provide better economic information, the system described herein may calculate profit based on all or most of the costs actually associated with the product being made at the current time.

Figure 2:
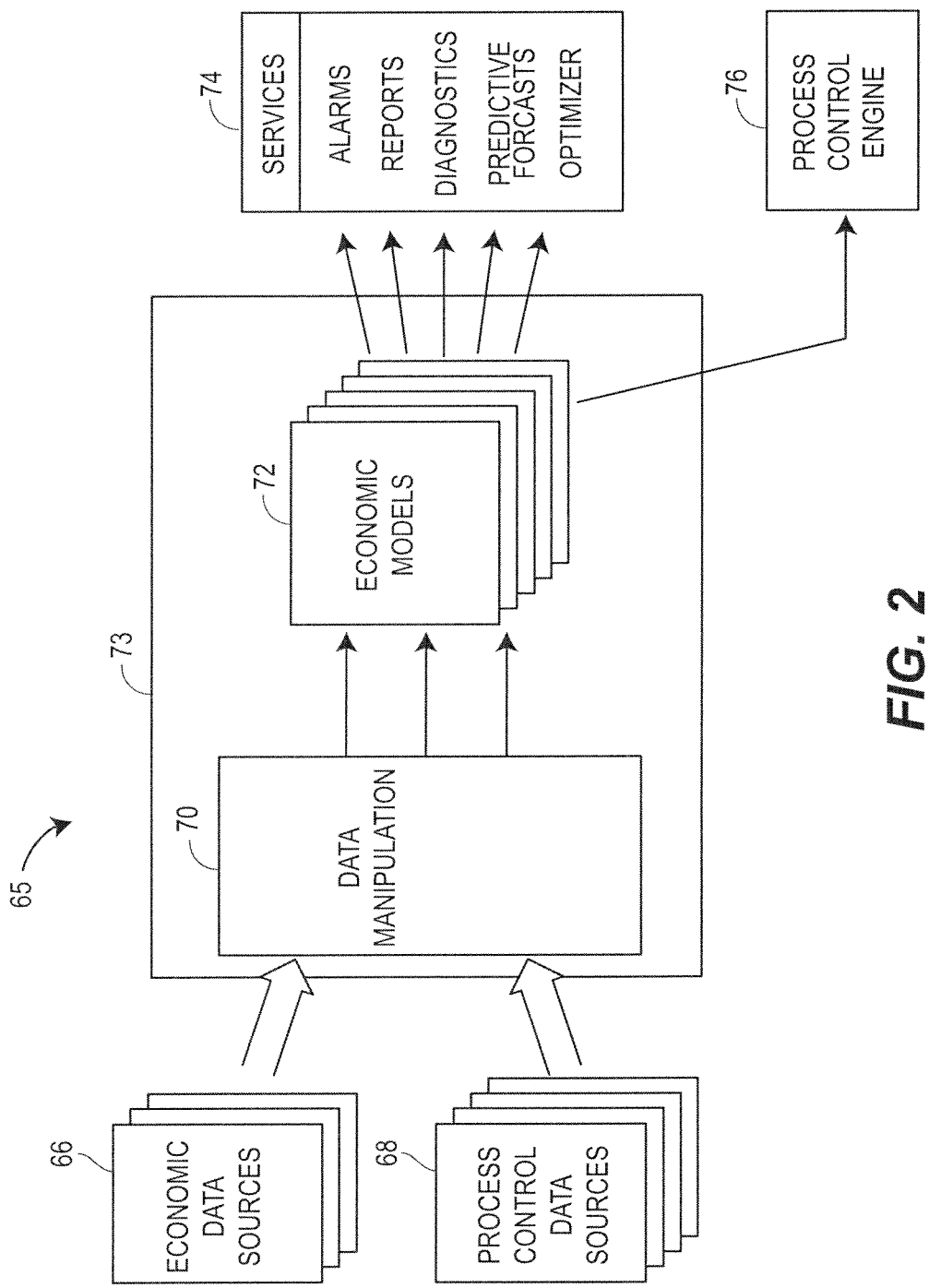
FIG. 2 is data flow diagram illustrating data flow within the plant of FIG. 1.

Referring now to FIG. 2, a data flow chart 65 illustrates the flow of data to different entities within a system that enables economic calculations to be integrated into and used within a process control network to direct or control operation of the process control network. In particular, different data sources, including economic data sources 66 and process control data sources 68 collect and provide different types of data to a data manipulation module or block 70. The economic data sources 66 may provide any types of economic data while the process control data sources 68 provide any type of typical process control data, such as device and controller data indicative of, for example, the state of the process control devices, units, loops, etc. as well as process parameters and any other data collected within the process control system.

The data may be acquired online directly from process equipment, controllers, sensors, transmitters, laboratory equipment, analyzers, video equipment, imaging equipment, microphones and databases, such as market and commodity, feedstock, raw material database, and may be indicative of, for example, flows, temperatures, pressures, compositions and other variables measured or determined by process or equipment measurements or services. The economic data may be, for example, supply cost information, sales and sales price information, tax, duty, shipping and handling costs, etc., personnel status and location etc. as appropriate to the entity being managed.

If desired, local archival storage of data may be used (e.g., within the data collector) to insure that data is not lost should communications or other system components fail or be unavailable for any reason. The data may also be compressed locally by the data collector using any desired data compression technique, such as swinging door or recursive wavelets exception transmission, data transformation, filtering etc. to reduce the required communication bandwidth and to increase the speed and responsiveness of the system while minimizing archival storage requirements.

The data manipulation block 70, which is optional, may include one or more applications that massage the data from the various sources for different purposes. For example, the data manipulation block 70 may use neural networks or other modeling or estimation techniques to provide missing data, e.g., data that is either not present due to missing or malfunctioning measurements, analyzers or instrumentation or measurements that are inherently not directly measurable. While indicated as being performed after data is collected, the data manipulation stage 70 may occur in part or in whole locally in transmitters, analyzers, intelligent equipment or other devices that measure or otherwise acquire the data.

As illustrated in FIG. 2, after being processed, the data is provided to one or more models 72 which may perform different economic calculations on the economic and process data to provide information that may be provided to and used by one or more services or service applications 74 which are discussed in more detail hereinafter. The objective of the models 72 is to devise, for example, a measure that determines what percentage of the manufacturing and support resources is consumed by each shift/day and/or product. As a simple example, product runs need to be charged according to resources consumed at the time the product is run (not at the end of the month after costs are lumped and redistributed). Likewise, costs need to be transferred between unfinished and finished products cost centers when products are complete or when products are sold as either unfinished or finished.

Of course, there are many other factors to consider and to take into account when constructing models to accurately reflect the economic state of the process. In fact, there are many factors effecting costs including, for example, material costs, equipment efficiency, utilities costs (heating on gas, oil, recycled materials), etc. The models 72 can be used to provide or determine these efficiency numbers and the costs to be used as part of the process control system to monitor and alter the operation of the process to make the process more profitable. Ideally, profit calculations need to include the price being paid for a particular customer order and the costs at the time of manufacture for the product run.

There are, of course, potentially many different aspects in determining profit. For example, profit calculations require detailed knowledge about the price being paid by the customer. If a manufacturing lot is tied to a customer order, then the profit may be computed from that sale price. If the production is continuous, then the profit may be based on product price. Of course, each of the cost and profit calculations will vary depending on the circumstances and the nature of the product being manufactured, as well as the marketing and sales strategy being used. Generally speaking, however, the models 72 are constructed to calculate variability, operating constraints, energy and material balances to determine economic, financial, and equipment health performance on line for fast decision support, control or other uses. The models 72 may also provide the profitability, cost and financial return for each product, grade, campaign or batch run and, in doing so, may use total derivatives to estimate changes from a base value of critical cost or profit. This technique is applicable as an adjunct to direct computation of the desired variable when the errors of measurement or speed of measurement would degrade or slow the result. Such a total derivative methodology allows fast and accurate computation of changes in the desired variable from the measured changes in the component variables. If desired, the models 72 may reconcile calculations to minimize closure errors (i.e., compare the calculations to actual profit realized and alter the calculations to minimize the error between the calculated profit and the actual profit).

If desired, the models 72 may be coupled to a controller engine 76 which can provide intentional perturbations to elements or loops within the process control system for the purpose of verifying, validating and reconciling measurements, analyzers, sensors, etc. as well as operating cost, profitability, quality and equipment health data. In this manner, providing a known perturbation (with attendant known changes in profitability) can be used to test and determine if one or more of the models 72 calculates the same or similar change in profitability, to determine how to reconcile profitability measurements with the calculations made by the models 72.

Additionally, if desired a data manipulation block 70 and one or more economic models 72 may be coupled together within a single process module 73, as illustrated in FIG. 2. While only one process module 73 is illustrated in FIG. 2, any number of different process modules could be created and run within the process plant, with each process module having different economic models therein and coupled to the same or different data sources 66 and 68. Likewise, each of the process modules 73 may be stored in and executed on a processor in any desired location within the process plant, such as in a user interface, a controller or even a field device. Generally speaking, process modules 73 are self contained or individual objects, such as objects in an object oriented programming language, that operate to perform the functions of data collection and processing using the economic modules 72. If desired, the process modules 73 may communicate automatically with the data sources 66 and 68 and with the services 74 using pre-established communication links set up during configuration of the process modules. Furthermore, the process modules 73 may be set up to be similar to other programming blocks executed in a user interface, a controller, etc. As a result, the process modules 73 may include modes, execution rates, alarms, etc. and may participate in span of control (e.g., be subject to security restrictions), etc. As the process modules 73 are individual units that can be executed in any convenient location within the process plant, they are easy to implement to perform the economic functions described herein.

The services or service applications 74 may include any number of different applications that use the information or economic calculations produced by the models 72. For example, the service applications 74 may include one or more reporting applications 80 which may provide reports to users in any desired manner. The reports may take the form of real time spread sheets, allowing data to be analyzed, trended, plotted, logged and presented to a user to allow decision support based on current and historical information as well on derived measures such as costs, profitability, return on investment, equipment health, quality etc. The reports may compare historical, current and forecasted relative equipment health, reliability, safety, quality, costs, profitability, throughput, asset utilization, inventories, accounts receivable, accounts payable, days in cash cycle, return on assets, cash flow and/or other parameters of the process control system entities being monitored with other entities, maintenance facilities, companies, processes, plant sites, units, etc. both for current conditions as well as for past and forecasted future performance. If desired, these reports in the form of, for example, spreadsheets, can be embedded into runtime controllers, devices, equipment and users can configure the spreadsheets in any manner currently performed in the art for generating reports. These report generation applications can then be run embedded in the real-time system to automatically produce the desired reports.

The service applications 74 may also include one or more forecasting applications 82 of any desired typed. Advanced forecasting techniques, such as ARIMA, moving window Fourier or other data transformation methodologies, statistical trending, calculation of future response based on prior actions, current measurement values and real-time models (such as process models) may be used to compute future values of any of the measurements, compositions, healthy data, costs, profitability etc. This forecasted future data may be provided to controllers, alarming applications, etc. to enable anticipatory alarming, control, emergency response etc. not allowed by current methods or systems.

Still further, one or more diagnostic applications may be provided to perform diagnostic procedures using economic data in a manner that provides a more complete diagnostic analysis. In one example, a diagnostic application may access dynamic parameters associated with function blocks or other control blocks within the control system, such as DeltaV and Fieldbus function blocks, and provide high speed analysis on this data. In this application, a selected number of parameters may be accessed during or after each execution cycle of a control module or function block. The diagnostic application may trend these values or analyze these values using any desired power spectrum, correlation and statistical techniques. Also, the diagnostic application may allow the user to directly access other diagnostic data provided by other diagnostic applications, such as the AMS diagnostics. For control blocks, the diagnostic application may provide access to diagnostic data associated with, for example, tuning applications, etc.

Of course, the diagnostic application may provide additional analysis tools such as those that perform power spectrum, cross correlation, and auto correlation on any desired variables. The diagnostic application may still further direct the customer to the appropriate solution, such to one or more tuning applications, etc, may utilize high-speed data provided by Fieldbus trend objects or virtual trend objects based on traditional input/output (I/O) in the controller, may collect trend information on-demand or perform any other desired procedures.

If desired, the diagnostic applications may support continuous monitoring and detection of abnormal conditions that may exist in control blocks and input/output blocks or other blocks within the process control system. Such a diagnostic application is described and illustrated in U.S. Pat. No. 6,298, 454, is hereby expressly incorporated by reference herein. Using this technique, it is possible to identify blocks that contain one or more abnormal conditions for more than a specified percent of time. In addition, the I/O or control blocks that exhibit high variability may be identified.

In general, this application may include tools to allow a user to quantify the cost of process variability based on, for example, total and capability standard deviations, user defined limits and the cost of the product. The application may also generate pre-defined reports that may be directly used by a user to justify improving control. As described in U.S. Pat. No. 6,298,454, this tool can include a status parameter that allows detection of abnormal conditions to be suspended such as when the module is not being used, to prevent false alarms from being generated when a process is off-line, in startup, etc. This tool may also allow plant performance and utilization to be saved by a data historian to support charting or plotting by the month, year, etc., with this data being available by plant area, process cell or other logical entity. This diagnostic application may, of course, provide predefined reports that summarize and detail bad conditions, provide dynamos to allow conditions and economic calculations for a unit or other entity to be easily summarized at an operator screen and to provide context sensitive help for process analysis.

Still further, the service applications 74 of FIG. 2 may include one or more control or advanced control applications. For example, a multivariable control application, such as an MPC application, may use the collected historical and/or current and/or forecast data, including economic data, to determine advanced profit and/or cost control for the multivariable control situation. Likewise, one or more known types of optimizers may use the determined economic data to perform on line optimization of cost, profit, quality, availability, safety, throughput, etc. Such an optimizer may use data measured from and indicative of the actual real process, product, equipment, machinery, plant, unit operation, area, enterprise, materials, feed stock, intermediates, entities or parts or aggregations thereof or use simulations of some are all of these entities or both to perform optimization.

The advanced control applications may also include a scheduler application that uses one or more of on-line historical, current and forecasted data in conjunction with one or more of equipment status, order status, economic data, environmental data, regulatory data, market data, competitive data, etc. to select and/or schedule the products or grades to be manufactured, the maintenance to be performed, or the equipment or the arrangement of equipment to be used to manufacture a product most economically.

The service applications 74 may also include an alarm/alert application that may be used to provide alarms or alerts based on the output of the models 72. In particular, the alarm/alert application may compare certain economic variables, such a profitability, etc. with fixed or preset ranges or values and provide an alarm or alert if the profitability or other economic variable falls outside of the range or below or above the preset value. These alarms (or alerts) may be sent to any desired user in any desired manner, such as wirelessly, via the process control communication network, the business network, a pager network, e-mail, etc. As part of this process, a diagnostic application may include an agent that recommends advanced control tools that should be used to address problems areas. Still further, the alarm or alert application may allow a user to assign different priorities to measurements or control blocks. In this case, an alert, mail message or pager notification can be issued when an abnormal condition is detected in a block in an active unit with the priority set by the user or based on the priority set by the user.

While not specifically illustrated in FIG. 2, the data sources 66, the data manipulation block 70, the models 72 and the service applications 74 may be configured to communicate with one another in any desired manner using any desired communication infrastructure to determine the process, plant, unit operation, area, product, grade, run, profitability, cost, return on invested capital and other measures. Generally speaking, the data and/or results may be transmitted via wired, wireless, fiber optic, optical, or other means for archiving, aggregation, presentation, analysis, decision support, control or other use. If desired, a global positioning system (GPS) or other on-line physical location determination structure may be used to provide position as a system input for calculation and control as well for enabling support of mobile measurement and analytical components. If desired, the sensors used to collect data may be analyzers, imaging devices, etc. may be non-contacting or remote in nature. Still further, data and information transfers may be protected by error detection, correction codes or other methods such as BCH, redundant transmission, n-level fire coding, etc. Data may also be encrypted using any desired or appropriate method in acquisition, transmission, storage or use. Furthermore, data collection or other data manipulation entities, such as the models 72 and the service applications 74 may be distributed between multiple physical locations if so desired.

While FIG. 2 illustrates the different elements of the combined economic and process control system, the entire functionality may be provided as a service rather than as a purchased system. In this case, a customer would purchase a service that would install the appropriate or desired models and services within a process plant and operate them to provide integrated economic data with process control data for any of the uses described above. This service would allow broader systems to be used by clients and users who otherwise would not be able to afford or support such a system. The service could, of course, be billed on a metered usage basis and the, if desired, the equipment and/or its installation, commissioning, operation and maintenance may be provided on a lease, rental or usage basis. Still further, as part of this service, an on-line consulting service may be provided where the data for a process system is provided to a consultant, who runs the models and services (e.g., analysis tools and expert systems) and provides on-line or off-line consulting and/or contracting services that address performance and performance issues within the process plant.

Figure 3:
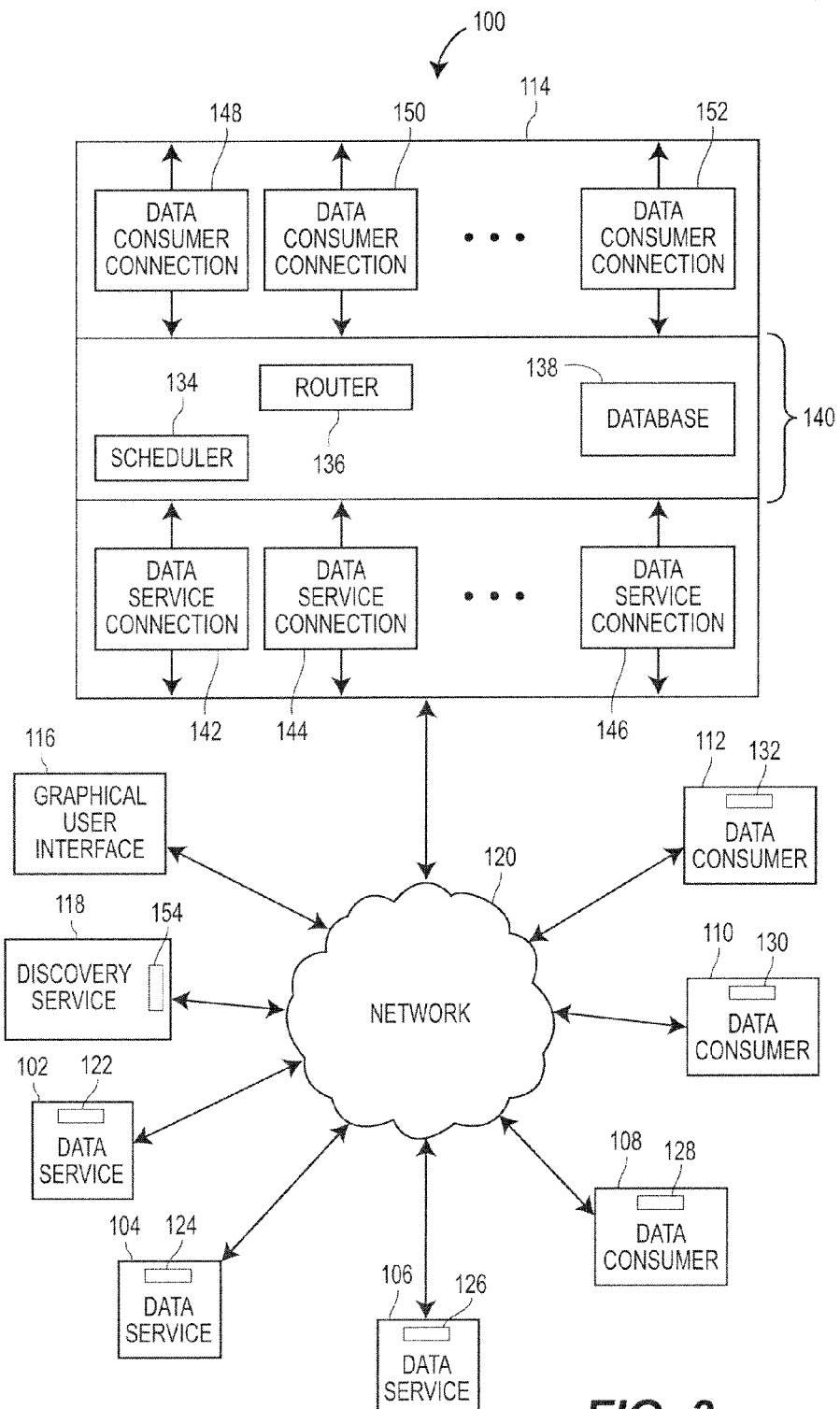
FIG. 3 is a diagram of a plurality of data sources communicatively interconnected to a plurality of data users via a communication scheduler system.

Referring now to FIG. 3, a web services-based communication system that may be used to facilitate the communication and viewing of information associated with the process control system or plant, including business or financial information, is illustrated in a logical format. This web-services based communication system may be, for example, located within the computer or server 45 of FIG. 1 and be used to obtain information from the financial or business systems and provide this information to the models 72 of FIG. 2 (which may be within, for example the process control system 14 of FIG. 1). Of course, the web-services based communication system, the models 72 and the service applications 74 may be located in any other desired part(s) of the plant 10.

More specifically, the web services-based communication system and technique described herein includes a communications engine that performs message routing, scheduling and configuration functions for a plurality of clients or web-services and, for this particular purpose, for providing on-line or up-to-date financial or profit data to the process control system 14 of FIG. 1 for use in computing or calculating the current profitability of the process plant and for use in changing the operation of the plant to be more profitable.

The web services-based communication system and technique described herein may include a graphical user interface that enables one or more users to configure and/or add web-services to the system and to create a highly personalized profile that causes the communications engine to route selected process control information and other information to be displayed to the user via the graphical user interface in a manner desired by the user. This feature enables a multitude of different profitability data associated with different plant environments to be provided to the process control system for on-line profitability purposes.

In any event, the web services, the communications engine and the graphical user interface may communicate with one another via a network such as, for example, the Internet using an extensible markup language (e.g., XML) or any other similar language that enables applications, services and/or systems to communicate with one another without requiring the development of custom communication interfaces or drivers.

Generally speaking, the web-services described herein may include data services or sources, which may be business systems, that collect and store data needed to make current profitability analyses and data subscribers or consumers which may be, for example, applications implemented in the process control or process maintenance systems, to perform on-line profitability calculations. On the other hand, the data services or sources may be process control systems or applications, asset management systems or applications, equipment condition monitoring systems or applications, diagnostic systems or applications, or any other system or application that acquires or generates information or data associated with the operation of a process control system or plant as well as business systems or financial data sources. Likewise, the data subscribers or consumers may include user-interactive applications such as, for example, diagnostic applications, control optimization applications, reporting systems including paging systems or applications, e-mail systems or applications, file generation systems or applications, etc.

As will be understood, each of the data services and data consumers may be an application or system that includes a web services interface. As is well known, a web services interface may use an extensible markup language such as XML in conjunction with a messaging protocol such as, for example, simple object access protocol (SOAP) and a communications transport protocol such as, for example, hypertext transport protocol (HTTP). Because web services are somewhat generic in nature (i.e., the behavior or characteristics of the communications via a web server interface are independent of any underlying application or system), data services and data consumers can be easily connected to (i.e., communicate with) the communications engine without having to create any custom communication interfaces, as typically was the case with prior systems. Additionally, the communications engine may be easily adapted to discover or find (either automatically or at the direction of a user) web services that are available for connection to the communications engine. For example, the communications engine may use a web services discovery tool or service such as, for example, universal discovery description and integration (UDDI), or any other type of web services discovery tool or service to identify available web services.

Still further, the web services-based communication system and technique described herein provides a system architecture that results in efficient and robust data collection, data analysis and data communication. In particular, the communications engine may request data from the data services as it is needed by the communications engine. Alternatively, one or more of the data services may be configured to asynchronously notify the communications engine as new data or information becomes available. In either case, efficient use of communications resources (e.g., communication links, processing capacity within the communications engine, etc.) may be achieved by the system and technique described herein. In particular, only newly available and/or data needed by the communications engine is conveyed between the various data services and the communications engine, as opposed to collecting all available data from the data sources regardless of whether the data was needed, as was the case with prior systems.

Further, with the web services-based communication system and technique described herein, the data services may perform complex analyses and may communicate analysis results (in addition to raw data, if desired) to the communications engine and, in turn, to the graphical user interface and/or other data consumers. Thus, because the web services-based communication system and technique described herein is adapted to transmit only requested and/or newly available data and, if desired, only analysis results (as opposed to all data required to perform the analysis at a central location such as the communications engine or the graphical user interface application), the web services-based communication system and technique described herein facilitates highly efficient use of available communication network bandwidth.

The web services-based communication system and technique described herein also provides a high degree of data robustness. In particular, each of the web services may be responsible for data backup, storage of data history, etc. As a result, a communications and/or power failure at the communications engine and/or the graphical user interface will not result in the catastrophic loss of data, and recovery of the system can be quickly and easily accomplished upon restoration of power and/or communications to the communications engine and/or the graphical user interface. Likewise, failure of a particular web service will not result in a catastrophic failure of the entire system, and when the failed web service recovers, the system can easily begin communicating with that web service without having to be reconfigured, restarted, etc.

FIG. 3 illustrates a functional block diagram that generally depicts an example of a web services-based communication system 100 that may be used with a process control plant or system such as that of FIG. 1. As shown in FIG. 3, the system 100 includes a plurality of data services 102-106, a plurality of data consumers 108-112, an information server 114, a graphical user interface 116 and a discovery service 118, all of which may be communicatively coupled to the same or different networks 120. In general, the data services 102-106 are systems or applications that perform data collection, generation and/or analysis activities. The data services 102-106 may be, for example, process management applications, business applications, financial or accounting services or databases, or other types of applications or databases associated with a process control system or plant that are performed by one or more servers or other computers within the process control system or plant. Of course, the data services 102-106 may correspond to a single process control system or plant or may correspond to more than one process control system or plant.

Each of the data services 102-106 may include field devices, controllers, workstations, etc. that are communicatively coupled via one or more communication networks and/or other types of communication links. If desired or necessary, each of the data services 102-106 may perform process control activities such as, for example, execution of control loops, may perform diagnostic activities, may perform asset management activities, etc. for a collection of equipment or devices associated with a particular process plant or portion of a process plant. Further, each of the data services 102-106 may also perform data historian functions, may include redundant or failsafe devices, may perform data analysis activities, all of which are generally well known in the art and, thus, are not described in greater detail herein. Still further, and for the purposes discussed herein, the data services 102-106 may include computers or other data acquisition devices of any type that collect, store, generate, etc. financial data needed to make profit determinations within a process plant.

Preferably, the data services 102-106 include respective web services communication interfaces 122-126, which enable the data services 102-106 to communicate within the system 100 as web services when connected to the network 120. The web services communication interfaces 122-126 may be implemented using XML messages that have been formatted using SOAP, or any other desired message protocol, and which have been encapsulated for transmission using a network transport protocol such as, for example, HTTP.

In general, the data consumers 108-112 are systems or applications that perform activities or functions that consume process control data and/or which convey data or information provided by the data services 102-106 to system users or operators. In this instance, the data consumers 108-112 may be the models 72 of FIG. 2. One or more of the data consumers 108-112 may perform primarily communication functions that can route data or information to system users or operators using a particular communication media and platform. For example, data may be delivered by one or more of the data consumers 108-112 using hardwired or wireless media and using any desired system or hardware platform such as, for example, a laptop, a personal data assistant, email, etc. Alternatively, or additionally, one or more of the data consumers 108-112 may perform primarily user-interactive activities such as, for example, batch definition and campaign management activities and/or may perform other primarily business-related activities such as, for example, order processing activities, accounting activities, product shipping and administration activities, product inventory control activities, quality assurance activities, procurement activities, etc. As with the data services 102-106, the data consumers 108-112 also include respective web services communication interfaces 128-132, which enable the data consumers 108-112 to communicate as web services within the system 100.

As illustrated in FIG. 3, the information server 114 includes a scheduler 134, a router 136 and a database 138, which collectively function as a communications engine 140 that performs message routing and scheduling activities as well as system configuration activities, as described in greater detail below. The communications engine 140 may establish a plurality of data service connections 142-146, each of which corresponds to one of the data services 102-106, and may similarly establish a plurality of data consumer connections 148-152 that correspond to the data consumers 108-112. The communications engine 140 may dynamically establish the connections 142-152 as they are needed to communicate with the data services 102-106 and the data consumers 108-112 via their respective web services interfaces 122-126 and 128-132.

In general, the router 136 performs message routing functions that receive messages from one or more of the web services, which includes the data services 102-106 and the data consumers 108-112, coupled to the network 120 via the connections 142-152 and route these received messages to appropriate destinations, which may be any of the web services (e.g., the data services 102-106 and data consumers 108-112) coupled to the network 120. More specifically, the router 136 may function in a manner similar or identical to an XML transaction server. The router 136 may use input and output schemas in conjunction with business rules, data manipulations, etc., all of which may be stored in and retrieved from the database 138, or which may be provided by another one of the web services coupled to the network 120, to route XML messages received from one or more of the web services coupled to the network 120 to another one or other ones of the web services.

By way of example, the data service 102 may generate alarm or alert information that needs to be conveyed to the data consumer 112, which may be a communication system or application such as an e-mail system or application. When the alert or alarm information is generated, the data service 102 uses its web services interface 122 to wrap the alert or alarm information in an XML schema to form an XML message, encapsulates the XML message using HTTP and sends the XML message to the network 120. The network 120 uses the HTTP encapsulation to route the XML message, using known techniques, to an appropriate one of the data service connections 142-146 available within the information server 114. The communications engine 140 receives the XML message from the one of the data service connections 142-146 that received the XML message and the router 136 uses an appropriate input schema (retrieved from the database 138) to decode the XML message. The router 136 may then, based on the content of the decoded message and one or more rules and/or data manipulations, map the contents (or a portion of the contents) of the message to an appropriate output schema associated with the destination (i.e., the data consumer 112), which may also be retrieved from the database 138. The router 136 may then encapsulate the mapped alarm or alert message (which is also an XML message) using HTTP and may send the encapsulated message to the data consumer 112 via the one of the data consumer connections 148-152 associated with the data consumer 112 and the network 120 to the data consumer 112. The data consumer 112 then receives the alert or alarm information via its web services interface 132 and may generate an e-mail message that conveys the alert or alarm information to one or more designated or applications.

Thus, the router 136 is adapted to process messages, which are preferably, but not necessarily, expressed using XML or some other extensible markup language, received from a plurality of web services such as, for example, data services, via a communications network and routes or sends these messages to other web services that are also coupled to the communications network. Because all of the data generation and data consuming applications or systems that make up the system 100 are configured to communicate as web services, the information server 114 and, more particularly, the communications engine 140, can dynamically establish communications with any of the data generation or consuming applications or systems by adding or removing connections (e.g., the connections 142-152) without having to generate any custom communication interfaces or drivers and without having to halt the operations of the communications engine 140 (i.e., connections to applications can be established without disturbing communications between already connected web services and the communications engine 140). To the contrary, because each of the data services 102-106 and each of the data consumers 108-112 includes a web services interface and because the communications engine 140 is adapted to communicate with web services, it is not necessary for the information server 114 or for any of the web services coupled to the network 120 to have any detailed knowledge about the operation of the systems or applications being performed by any of the other web services to enable information to be exchanged between the web services via the information server 114.

In general, the scheduler 134 performs scheduling functions that enable the communications engine 140 to periodically request information from one or more of the data services 102-106. More specifically, the scheduler 134 may establish periodic requests for information or data from one or more of the data services 102-106, particularly where the information requested is of a type that would not generate an event. For example, if one of the data consumers 108-112 periodically needs information or data such as costs or prices associated with raw materials or finished products from one of the data services 102-106, the scheduler 136 may be configured to periodically send messages requesting this data to the one or ones the data services 102-106 which may store or have access to this data. The one or ones of the data services 102-106 receiving the request may subsequently send the data to the information server 114 in the form of an HTTP encapsulated XML message, which may then be routed by the router 136 to the appropriate ones of the data consumers 108-112, such a one of the models 72, via the network 120.

The discovery service 118 may also include a web services interface 154 that enables the discovery service 118 to communicate with the information server 114, the data services 102-106 and/or the data consumers 108-112, as desired. The discovery service 118 may be a web services directory or registry service such as, for example, UDDI or any other similar or different web services directory or registry. As is well known, UDDI enables a web service to discover and obtain interface and/or communications information about another web service, which may then be used by the discovering web service or server to automatically establish communications with the discovered web service.

The system 100 may use the discovery service 118 to automatically or dynamically establish communications between the information server 114, the data services 102-106 and the data consumers 108-112, without requiring intervention from a system user, or operator, a programmer, etc. By way of example only, at initial start-up or power-up of the system 100, the information server 114 and, in particular the communications engine 140, may communicate with the discovery service 118 to determine what web services are coupled to the network 120 and available for use by the system 100. The communications engine 140 may store available web services and communications interface information pertaining to available web services in the database 138. The information related to available web services may then be automatically and periodically updated by the communications engine 140 no that if a web service becomes unavailable, becomes available, and/or if communications interface information relating to any available web service changes, such information may be reflected in the database 138 for use by the communications engine 140 in routing and scheduling communications.

Each of the web services that is discovered, licensed (if required) and coupled to the information server via the network 120, may have a unique service identifier (SID) associated therewith. In this manner, the communications engine 140 may store communications interface information and other information pertaining to each of the available web services in a table or any other data structure within the database 138. The table or other data structure may subsequently be used by the router 136 and the scheduler 134 to route messages received from particular services and to schedule information requests from particular services.

The graphical user interface 116 performs functions that enable a system user or operator to selectively view information provided by the data services 102-106 and/or the data consumers 108-112, to configure communications (e.g., to schedule information requests, establish routings, etc.) within the system 100 and/or to generally interact with applications or services that are communicatively coupled to the network 120 via the information server 114. The type of information presented by the graphical user interface 116 and the manner in which information may be presented by the graphical user interface 116, may vary from user to user based on profiles that are defined by the users and stored in the database 138. By way of example, a user may initially interact with the system 100 via the graphical user interface 116 to define a profile and the information or content that the user wants displayed. A particular user's profile may include information associated with the user's organizational role (e.g., manager, engineer, executive, etc.), the hours that the user works (e.g., the user's shift), the personal preferences of the user, the manners and times in which the user may be contacted off-site or on-site, etc. Additionally, the user profile information may be sent by the graphical user interface 116 to the information server 114, which may store the user profile information in the database 138.

In addition to user profile information, configuration information associated with each user may also be stored in the database 138. A user may interact with the graphical user interface 116 to establish the manner in which the user wants to view information from the data services 102-106 and the data consumers 108-112, the manner in which the user wants information to be conveyed between the various web services coupled to the network 120, etc. To store configuration information for each user, a table may be generated in the database 138 so that each user is assigned a unique identifier or a user ID (UID) and a user's desired configuration for each of the available web services is stored along with the UID and the SIDs of the services.

By way of example, when a user logs into the graphical user interface 116, they may be authenticated using their username and password. In turn, the username and password information may be used to create or may be associated with a security identifier (e.g., the UID). The graphical user interface 116 may send the UID for that user to the information server 114, which will then retrieve the profile and configuration information associated with that UID from the database 138. The profile and configuration information may then be used by the communications engine 140 to establish the manner in which messages will be routed, the manner in which the scheduler 134 requests information from the data services 102-106, the type and manner in which information will be displayed by the graphical user interface 116, etc. while that user (or at least that user's UID) remains in control of the graphical user interface 116.

While the graphical user interface 116 (and the software application or applications associated therewith) is depicted in FIG. 3 as being performed within a separate system, server, workstation or computer, the graphical user interface 116 may instead be instantiated within the information server 114 or any other server or computer system coupled the network 120, if desired. Of course, additional graphical user interfaces similar or identical to the graphical user interface 116 may be coupled to the network 120, thereby enabling multiple users to interact with the system 100 at the same time or at different times. Furthermore, it should be recognized that while the exemplary system shown in FIG. 2 depicts the network 120 as a single network such as, for example, the Internet, that links all of the components of the system 100, a variety of other network structures may be used instead. For example, some or all of the data services 102-106 may be communicatively coupled to the information sever 114 via an Ethernet network, while some or all of the data consumers 108-112 may be communicatively coupled to the information server 114 via another separate network, which may be based on Ethernet or some other protocol or standard. Of course, the web services and other components (e.g., the graphical user interface 116) communicating with the information server 114 may communicate using any desired combination of network types (e.g., Ethernet, Internet, etc.) using any combination of hardwired and wireless communication media.

Figure 4:
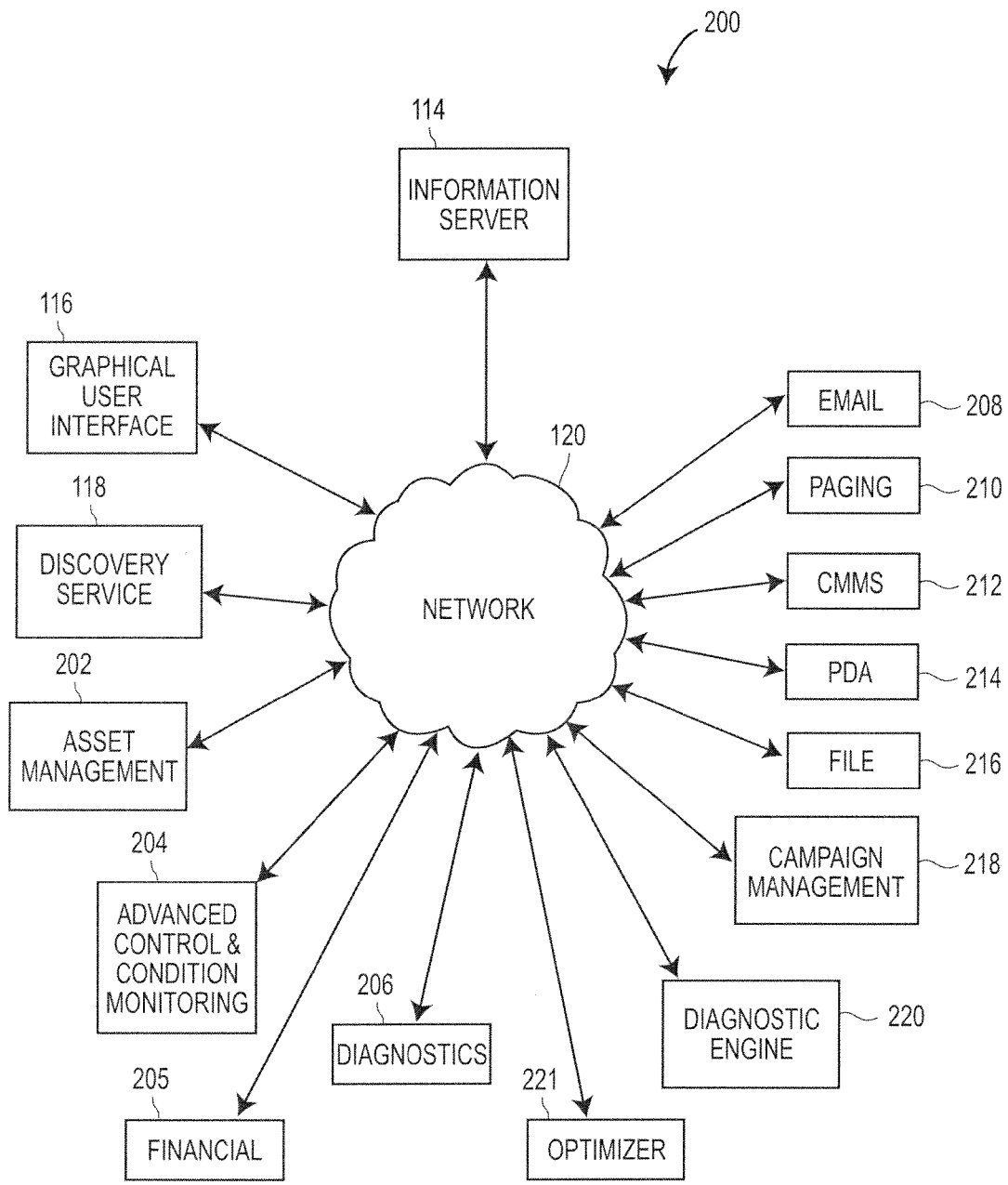
FIG. 4 is data flow diagram illustrating data flow within the system of FIG. 3.

FIG. 4 is an exemplary block diagram 200 of one manner in which the web services-based communication system 100 shown in FIG. 3 may be adapted for use with a process control plant or system. The exemplary system 200 shown in FIG. 4 includes the information server 114, the graphical user interface 116, the discovery service 118 and the network 120 that are shown in FIG. 3. However, the system 200 includes types of web services that would typically be associated with a process control plant or system. As shown in FIG. 4, the system 200 may include an asset management web service 202, an advanced control and condition monitoring web service 204, a business or financial information web service 205, and a diagnostics web service 206. Each of the web services 202-206 may correspond generally to the data services 102-106 shown in FIG. 3. Additionally, each of the services 202-206 may include an application or applications that are executed by different servers, workstations or other computer systems within a particular process control plant or system. For example, the asset management web service 202 may include a server that is performing one or more asset management software applications for a particular process control plant. These asset management applications may perform process optimization activities that seek to maximize plant profitability based on a wide range of information, including, for example, process control parameters, maintenance information, business information, etc. The advanced control and condition monitoring web service 204 may perform alarm or alert functions, process condition monitoring functions such as, for example, loop monitoring functions, real-time optimization functions, expert system functions, etc. and equipment condition monitoring functions such as, for example, vibration monitoring functions, predictive maintenance functions, etc. The business or financial information service 205 may include applications that perform scheduling, purchasing, cost accounting, storage of costs, prices, sales, etc. while the diagnostics service 206 may include applications that perform any desired types of diagnostics. In any event, the web services 202-206 may be characterized as data services because they include applications that acquire data and/or perform data analysis activities that generate analysis or results data.

The system 200 shown in FIG. 4 also includes a plurality of web services that may be characterized as data consumers. For example, the system 200 includes an e-mail web service 208, a paging web service 210, a computerized maintenance management system (CMMS) web service 212, a personal data assistant web service 214, a file system web service 216, a campaign management web service 218, a diagnostics web service 220, an optimizer web service 221, etc. The e-mail web service 208 may be adapted to generate email messages based on messages received from one or more data services such as, for example, the asset management web service 202, the advanced control and condition monitoring web service 204 and the diagnostics web service 208. The e-mail web service 208 may send these e-mail messages to, for example, one or more user interfaces, which may be identical or similar to the graphical user interface 116, and/or to some other computer system accessible by users. In a similar manner, the paging web service 210 may receive messages containing, for example, alarm or alert information from another web service within the system 200 via the information server 114 and the network 120 and may convey information relating to the alarm or alert to one or more pagers associated with one or more users (e.g., maintenance personnel, technicians, etc.) or other persons associated with the system 200. If desired, the models 72 of FIG. 2 may be incorporated into the data consumer web services, such as within the diagnostics applications 220, the e-mail notification applications 208, the campaign management applications 218, the optimizer applications 221, etc.

The personal data assistant web service 214 may receive messages containing information from data sources such as the web services 202-206 and may convey information contained in these messages to one or more personal data assistant computers, each of which may be carried or operated by a different person or user. In this manner, a system user may, if desired, configure the system 200 to send selected detailed information about the operation of a process control plant or system including, for example, diagnostic information, profit information, cost information, advanced control and condition monitoring information, asset management information, or any other information to their personal data assistant computer.

The file system web service 216 may receive messages containing process control data, diagnostic data, profit or economic data, etc. from one or more of the web services 202-206 via the information server 114 and the network 120 and may store the information contained therein in one or more data files, which may subsequently be accessed, transmitted, printed, displayed, etc.

The CMMS web service 212, the campaign management web service 218, the diagnostics web service 220 and the optimizer web service 221 may be characterized as user-interactive applications or services. The CMMS web service 212 may, for example, enable users to configure the type of and the manner in which alert or alarm information should be conveyed to them. Additionally, the CMMS web service 212 may perform functions that generate work orders (either in electronic or paper form) that may be printed or displayed at a central location such as, for example, a maintenance department within a process plant, that may be conveyed directly to the persons responsible for responding to the work orders, etc. Still further, the CMMS web service 212 may generate orders for replacement parts that may be needed to repair or otherwise maintain a process control plant associated with the system 200. The part orders generated by the CMMS web service 212 may, in turn, be sent in the form of HTTP encapsulated XML messages to a business system such as, for example, a procurement system (not shown) that is communicatively coupled to the network 120.

The campaign management web service 218 may include any desired campaign management application or applications that are used to define and manage the execution of one or more batch processes within a process control plant. The diagnostics web service 220 may include one or more applications that function to perform diagnostics within the process control system using profit data or profit calculations obtained on-line within the process plant from, for example, one or more business data systems. The optimizer web service 221 includes one or more optimizer applications used to optimize the control of the process plant based on particular constraints and optimized variables, which may be profit related variables in this case. Both the campaign management applications and optimizer applications are well known and, thus, are not described in greater detail herein.

It is important to recognize that data or information typically flows from web services such as the asset management web service 202, the advanced control and condition monitoring web service 204 and the business or financial information web service 205, all of which typically acquire data, analyze data and generate analysis results data, to primarily data consuming web services such as, for example, the e-mail web service 208, the paging web service 210, the CMMS web service 212, the personal data assistant web service 214, the file system web service 216, the campaign management web service 218, the diagnostic web service 220 and the optimizer web service 221. However, any one of the web services 202-221, the discovery service 118 and the graphical user interface 116 may send messages or exchange information with one or more of the other web services 202-221, the discovery service 118 and the graphical user interface 116 via the network 120 and the information server 114.

In operation, the system 200 may initially not have knowledge of any of the web services 202-221, may not have any user configurations or profiles stored within the information server 114 and, thus, may not initially route any messages from any of the data sources (i.e., the web services 202-206) to any of the data consumers (i.e., the web services 208-221). The information server 114 may then use the discovery service 118 to discover each of the available web services 202-

221, which are coupled to the network 120. In particular, the information server 114 may retrieve communications interface information (e.g., schema information, network address information, etc.) from the discovery service 118 and may store this information within its database 138 (FIG. 3) together with the SIDs that uniquely identify each of the discovered web services. Once the information server 114 has obtained the communications interface information and other configuration information associated with the discovered web services, the router 136 (FIG. 3) may then enable the exchange of messages between the web services 202-221 and the graphical user interface 116.

Users may interact with the graphical user interface 116 to create user profiles and configurations which are stored within the database 138 together with a UID for each user. The user profiles and configurations may be used by the graphical user interface 116 to control the type and manner in which data will be displayed to each user and may be used by the information server 114 to control the manner in which messages are routed between the web services 202-221. In this manner, when a particular user enters their authentication information (e.g., username and password) into the graphical user interface 116, the information server 114 retrieves the unique security identifier (i.e., the UID) associated with that user. The information server 114 may then use the UID to retrieve the configuration information associated with that user's UID from the database 138 and configures the router 136 and the scheduler 134 to operate so that messages are automatically conveyed to the graphical user interface 116 in the manner specified by that user's configuration and/or profile or by the application being accessed by the user. In the case where the graphical user interface 116 is implemented using an Internet browser application, the messages conveyed by the information server 114 to the graphical user interface 116 are preferably based on hypertext markup language (HTML), rather than XML, so that a conventional browser application may be used to display information to the user in the desired format. As different users log into the graphical user interface 116, the information server 114 automatically routes messages in a manner that will supply the information to the graphical user interface 116 as specified by that user's configuration. Thus, as each user uses the graphical user interface 116, the format and content of the information displayed will automatically be varied to suit that user's configuration and/or profile or application.

While the content and format of the information displayed within the graphical user interface 116 may vary as different users log into or use the graphical user interface 116, the various message routing configurations associated with the data consuming web services (e.g., the web services 208-221) may remain active for each of the user profiles stored within the database 138 (FIG. 3). Thus, users that are not logged into the graphical user interface 116 (or any other interface within the system 100) may nevertheless continue to receive messages via the email web service 208, the paging web service 210, or any other web service specified by their stored profile.

Likewise, applications, such as the data consumer applications, that are configured to receive information from other web services may do so in a continuous manner, regardless of whether a user is logged on or not. For example, an alert or alarm may be generated by a process control system or by a model or alarming application based on, for example, a profit analysis, and the alarming application may convert the alarm or alert into an XML message, encapsulate the XML using HTTP and send the message via the network 120 to the information server 114. The information server 114 may then process the received alarm or alert message and may thereby determine, using the user profiles and schemas stored in the database 138, to whom and in what manner the alert or alarm message should be conveyed. The information server 114 will then cause the router 136 (FIG. 3) to send the alert or alarm message to one or more users using or more of the data consuming web services (e.g., the web services 208-221). In particular, the router 136 may send the alert or alarm message to one user via the e-mail web service 208 and the paging web service 210 (based on that user's profile), may send the alert or alarm message to another user via the paging web service 210 and the personal data assistant web service 214, and may also send the alert or alarm message to the graphical user interface 116 to be displayed to a user that has entered a configuration that requires the display of such alarms or alerts when that user is logged into the graphical user interface 116 or any other similar or identical user interface within the system 100.

Figure 5:
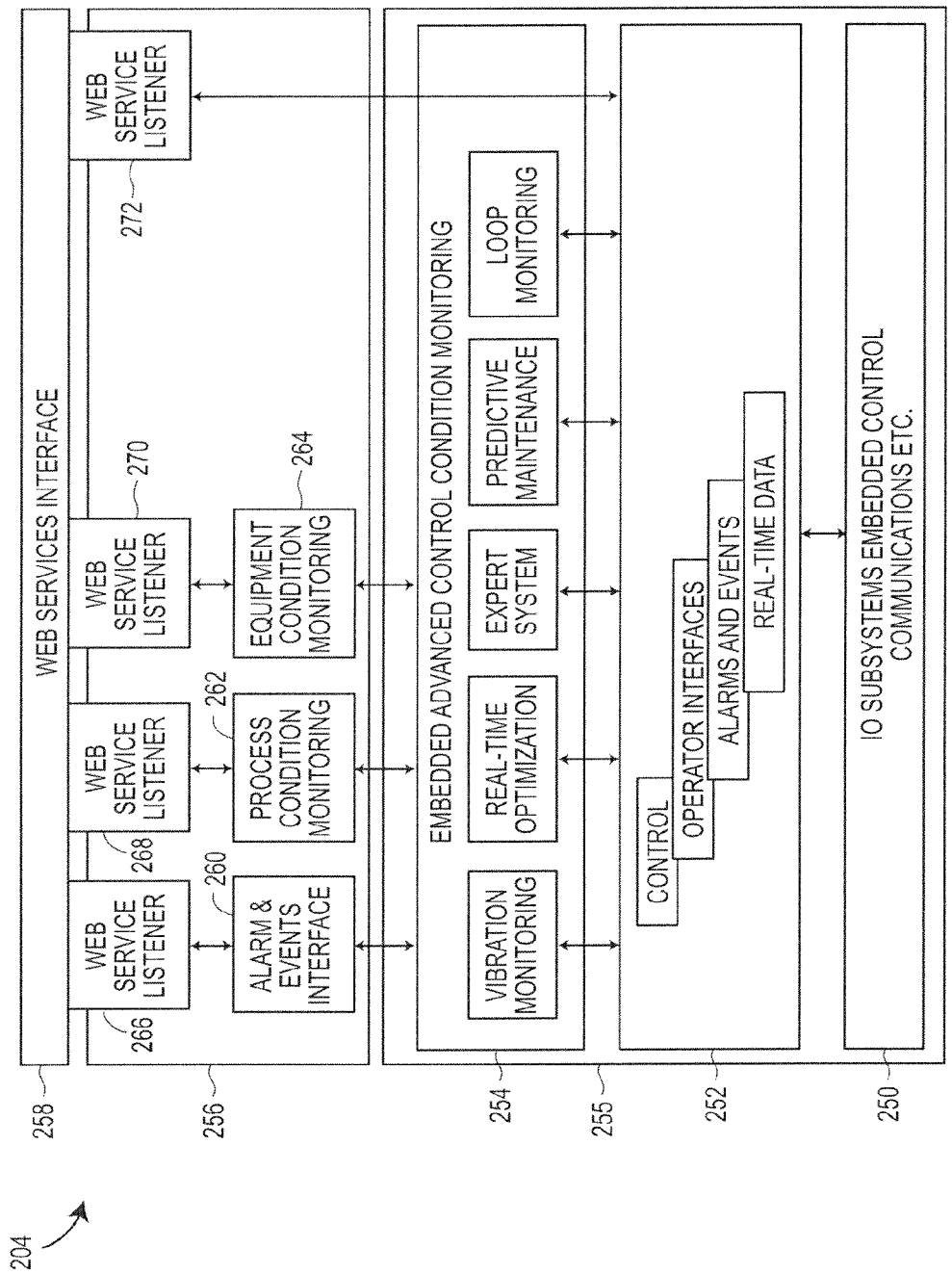
FIG. 5 is a functional block diagram illustrating one manner in which business systems can be communicatively interconnected with process control and process monitoring systems to be used in providing on-line financial calculations and analysis within a process plant.

FIG. 5 is a detailed functional block diagram of the advanced control and condition monitoring web service 204 shown in FIG. 3 and particularly adapted to provide financial information from business systems to applications within a typical process control system of a plant for use in optimizing the operation of the plant based on the financial information. As shown in FIG. 5, the advanced control and condition monitoring web service 204 includes an input/output (I/O) subsystems block 250 including logical categories of hardware within the process plant, such as units, equipment, devices, etc. The I/O subsystems block 250 is coupled to a control subsystems block 252 including traditional control routines, operator interfaces, alarm and event applications, diagnostic applications, on-line collection and storage of data, etc. An embedded advanced control and conditioning monitoring block 254 is also included and is illustrated as having alarm and event monitoring applications, process condition monitoring applications and equipment condition monitoring applications. The blocks 250, 252 and 254 collectively form a process control system 255.

Additionally, the advanced control and condition monitoring web service 204 includes a web services block 256 and a web services interface 258, both of which function to enable the process control system 255 to exchange information or messages with other web services via the network 120 (FIGS. 1 and 2) and the information server 114 (FIGS. 1 and 2). In particular, as illustrated in FIG. 5, the web services interface 258 enables the process control system 255 to exchange information with or to obtain information from business or financial services 260 associated with the plant. In this case, the financial services 260 is illustrated as including a maintenance management system (MMS) 262, a product inventory control system 264, a production scheduling system 266, as well as other financial applications 268, all of which are connected via a LAN or Internet communication link to an XML transaction server 270. The XML transaction server 270 is coupled to the interface 258.

As will be understood, the I/O subsystems block 250 includes controllers, I/O devices and field devices connected thereto. The process control subsystems block 252 is preferably, but not necessarily, implemented using one or more software routines or applications that may be executed within one or more of workstations of other computer systems. By way of example, the process control subsystems block 252 may include software routines or applications that carry out control functions, operator interface functions, alarms and events processing functions, real-time data processing functions, or any other desired functions.

The embedded advanced control and condition monitoring block 254 may be implemented using a plurality of software routines or applications that process data and other information associated with the operation, condition, etc. of a process control system such as, for example the process control system 14 of FIG. 1. For example, the embedded advanced control and condition monitoring block 254 may include diagnostic applications, alarm and event monitoring applications, equipment condition monitoring applications as well as reporting applications, real-time optimization routines or applications, expert system routines or applications, predictive maintenance routines or applications, loop monitoring routines or applications, or any other desired data analysis or data processing routines or applications including any of the other services 74 described in connection with FIG. 2. Of course, one or more of the routines or applications executed by the embedded advanced control and condition monitoring block 254 may be performed within the same computer system or workstation that is being used to execute routines or application associated with the process control system subsystems block 252. Alternatively, one or more of the routines or applications associated with the embedded advanced control and condition monitoring block 254 may be performed within any other workstation or computer system that is communicatively coupled to the process control subsystems block 252.

As illustrated in FIG. 5, the web services block 256 may include different web listeners or interface blocks 266, 268, 270 and 272, all of which may be communicatively coupled to respective applications within the block 254. Generally speaking, the web services block 256 enables information or physical data associated with alarms or events, process conditions and equipment conditions within a process control system to be conveyed to and from the information server 114 (FIGS. 3 and 4). More specifically, the web services block 256 provides a portion of a web services framework or architecture that facilitates intra-system communications because conventional and commonly used transport protocols, such as, for example, HTTP and data language and format protocols, such as, for example, XML and SOAP, may be used convey process control information to the information server 114.

As described in more detail below, the web service clients 266-272 receive incoming messages that contain requests for service, parse these incoming messages and dispatch the requests for service to appropriate methods available within the web services block 256. Preferably, but not necessarily, the web service listeners 266-272 receive service requests and also provide service responses. Additionally, the web service listeners 266-272 preferably, but not necessarily, convey alarm and event data, process condition data and equipment condition data using XML.

The web services interface 258 manages communications between the various web services within the web services block 256 and the information server 114, which may communicate with a process control system via the web services interface block 258 as a web client. In general, the web services interface block 258 provides a hosting or web server environment (i.e., a common interface) that enables a plurality of relatively technically diverse information systems such as, for example, manufacturing execution systems, enterprise resource planning systems, business systems, standalone computers, PDAs, cell phones, pagers, etc., or any other system associated with a process plant, customer, supplier, etc., to send and receive process control information or data to the process control subsystems block 252 and the advanced embedded control and condition monitoring block 250. In particular, the web services interface 258 is adapted to listen for incoming HTTP requests, perform security checks involving user authentication/verification, look up connection information and dispatch authorized HTTP requests to establish a connection with an appropriate one of the web service clients 266-272 available within the web services block 256, facilitate automatic recovery from service, hosting environment and system failures, and provide administrative facilities for deploying, monitoring and controlling services and managing resources such as, for example, processes, threads and shared state on behalf of each service.

In response to HTTP-based requests, the web services interface 258 may authenticate the requesting entity (e.g., another other web service) as a proper client of the web services block 256. Client authentication may be based on an identity of a user (i.e., based on the UID and/or some other identifier), the identity of the requesting entity itself, a terminal location or any other suitable identification technique. If the requesting entity is authenticated as a proper client, the web services interface 258 establishes a connection with an appropriate one of the web service listeners 266-272 within the web services block 256. For example, in the case that the requesting entity is interested in business information from the MMS 262, the web services interface 258 may establish a connection with a web service associated with the web service listener XML transaction server 270. Once such a connection is established, any type of business or maintenance system data from the MMS 262 and transmitted to the server 270 may be obtained and be communicated via one of the web service clients 272-276 to the process control system using HTTP packets containing XML formatted data.

On the other hand, when a device within the I/O subsystems block 250 generates a device alert or alarm such as, for example, a process control alert indicating a drop below acceptable profitability, the block 254 including this alarming application sends this alert to the web services block 256. In turn, the web service associated with the web service listener 272 converts the received maintenance alert into an XML format and then sends the XML formatted alert information or data to a user via the network 120. The user may be within the business system 260 or one of the other data users, such as a PDA, a pager, etc. Of course, as described above, appropriate input and output schemas need to be in place to properly convey the device alert information from the information server 114 within the block 256 to the appropriate data consuming applications or web services.

It should be recognized that the web services framework or architecture provided by the web services interface 258 and the web services block 256 enables any authenticated client to send or exchange information or data with the I/O subsystems block 250 and the process control subsystems block 252 using XML-based communications encapsulated within HTTP packets. Thus, any device that can execute an internet browser application can communicate with the process control system 255 via the web services interface 258 and the web services block 256. For example, a remote terminal or a hand held computer device adapted to execute a browser application may communicate with the control system 255 via the Internet or any other conventional or suitable communication link.

In one example embodiment, a diagnostics application may be configured to receive and use business or financial data to provide better or more accurate diagnostics for a process control system based on the profitability of the process control system. In particular, the diagnostics engine described in U.S. Pat. No. 6,298,454, which is hereby expressly incorporated by reference herein, may be used as a diagnostics engine for a process control system. As explained in U.S. Pat. No. 6,298,454, the diagnostics engine may be executed within one of the user interfaces of the process control network and be configured to receive appropriate data from the process control network regarding the on-line operation of the devices, controllers, etc. within the process control system. However, this same diagnostics application may include one or more economic models or be communicatively coupled to such economic models (such as those illustrated in FIG. 2) which determine profitability of the process control network on, for example, an hour, shift, day, week, etc. basis. As described above with respect to FIGS. 2-5, these economic models may be configured to automatically receive business or financial data pertaining to the various costs, charges, sales prices, etc. via the web services application described above. The economic models may also be configured to receive appropriate process control or diagnostics information, such as throughput, flow, utilization, or other measured or determined process parameters, as well as the variability, mode, deviation and status indications described in U.S. Pat. No. 6,298,454. Of course, any desired or appropriate economic model(s) may be used and be configured to receive any appropriate business and process control data, as well as any other desired data, to perform on-line economic calculations pertaining to the current operation of the process control system. The exact configuration of the economic model will, of course, depend on the nature of the process plant in which these models are being used as well as the type of economic analysis to be performed.

In any event, the economic model(s) may determine one or more outputs establishing an economic parameter associated with the operation of the process plant, such as financial or monetary aspects associated with the operation of the process plant, including the calculating and reporting efficiency, costs, savings, profits, etc. either in the aggregate or based on changes within the operation of the plant. For example, in the diagnostic application described within U.S. Pat. No. 6,298,454, an economic model may be used to assess the health and performance of instrumentation. This may occur by detection of abnormal conditions and variability in field devices and determining the costs or loss in efficiency that results from such abnormal conditions to enable a process control operator to determine the abnormal conditions that are most directly or significantly effecting the bottom line of the plant from a financial viewpoint.

As illustrated in FIG. 2, the economic model (or the diagnostics application if the economic model is contained therein) may provide its output to a process control application, such as an optimizer application, an on-line control routine, a control display application, an alarm generation application and the like. These applications may use the output of one or more economic models to perform, for example, optimization, on-line control and user display functions within the process plant. In particular, an optimizer may use the economic parameter(s) determined by the economic model(s) to determine a set of control targets for delivery to a control routine to use in performing on-line control of the process plant. Thus, the optimizer may optimize the operation of the plant based on the economic parameter(s) determined by one or more economic models. Likewise, an on-line control routine may use the economic parameter(s) developed by one or more economic models as feedback to perform on-line control of field devices within the process plant to thereby effect, for example, the throughput of the plant, the use of a particular raw material, the profit of the plant, the production of a particular product within the plant, etc. Still further, a display application may display the economic parameter(s) developed by one or more economic models to indicate a current or future state of the process plant with respect to some economic measure (cost, savings, profit, throughput, etc.) Moreover, an alarm generation application may use the output of the economic model(s) to generate alarms (including alerts) to be delivered to one or more users based on an operational state of the plant that is not meeting particular (or preset) economic measures.

Of course, the (e.g., automatic) use of the economic parameters developed by the economic models in the control of the process plant (e.g., in the automatic control of the process plant) may effect the diagnostic variables determined by the diagnostics application to thereby reduce or eliminate the problems detected by the diagnostic application. As will be understood from U.S. Pat. No. 6,298,454, some example diagnostic variables that may be used are variability parameters (such as the variability of signals within control loops), an operational mode indication associated with the mode of one or more control blocks within a control loop, a limit indication indicating that one or more signals within a control loop have reached a preset limit, etc.

As noted in U.S. Pat. No. 6,298,454, a parameter may be added to I/O and control blocks to support prevention of false detection of abnormal conditions when a process is off-line, in startup, etc. The enabling and disabling of elements of the process control system reporting may be performed at a unit, equipment, cell, area or system level and may be performed using an explorer view to select the item to be enabled or disabled within a configuration menu. Of course, the reporting of abnormal conditions enable and disable parameter may be added to modules that may be configured for detection and reporting for units, cells, areas, systems, etc. The Enable/Disable parameter may also be written to by other applications or other blocks to turn detection and reporting on or off. Still further, the diagnostics application or a reporting application may provide on-line documentation to report costs associated with process variability.

As an example, using the diagnostic application described in U.S. Pat. No. 6,298,454 modified to include (e.g., to communicate with) the economic models and reporting described herein, a customer may configure predefined calculations to determine the savings obtained by, for example, reducing process variability. The cost savings may utilize the total and capability standard deviation determined by the diagnostics application and the calculated savings may be viewed over a user selected timeframe (that is supported by diagnostic application, e.g., an hour, a shift, a day, etc.) The calculated savings may also be displayed with a graphical representation that shows the current standard deviation, best operating point or limit, and the shift in variation and operating point that is possible with better control and the associated cost savings.

The calculations that have been configured may be viewed and easily accessed in an explorer-like view or may be included automatically on a user or operator display. Cost savings associated with deviating from best operating point may also be automatically calculated based on user configuration of the controlled parameter, the unit throughput, best operating point, and cost per throughput unit associated with deviation in the controlled parameter. Cost savings associated with deviating from a maximum or minimum limit may be calculated based on user configuration of the controlled parameter, limit value, unit throughput, and cost per throughput unit associated with deviation in the controlled parameter.

The diagnostic application may automatically access the throughput and the controlled parameters configured in a calculation and determine their average value over each of the reporting periods supported by the diagnostic application. An overview report of all cost saving calculations may be printed for a selected timeframe and this report may summarize the standard deviation, estimated improvement in standard deviation, and cost saving for each loop. A detailed report may be printed for each calculation that shows the standard deviation and improvement graphically along with the saving.

Figure 6:
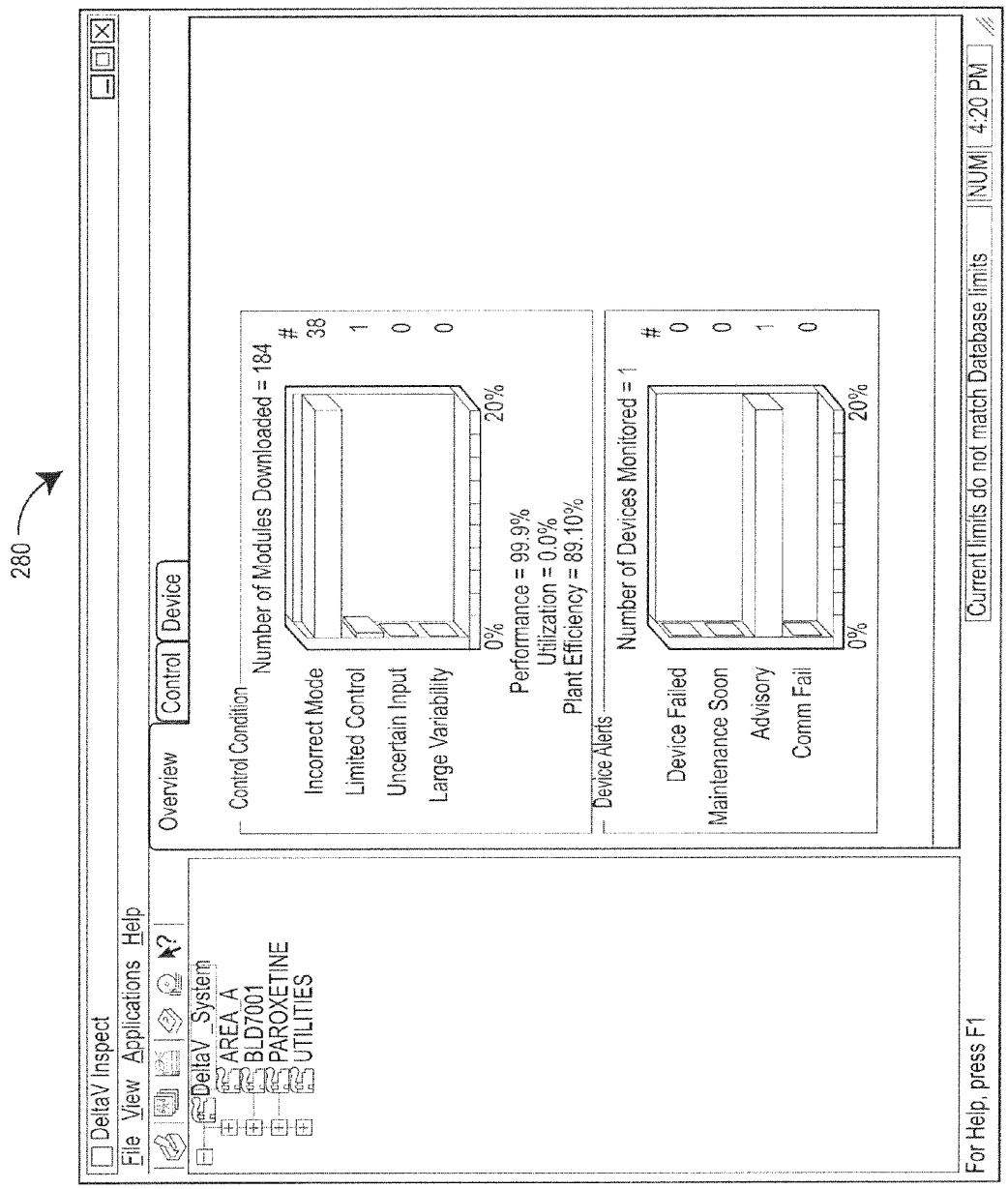
FIG. 6 is a first example screen view provided by a diagnostics application within the process control system of FIG. 1 illustrating the manner in which financial or economic data may be used to provide process control diagnostic information to a user.

FIG. 6 illustrates an example screen view 280 that may be produced by the diagnostic application described above to provide plant efficiency numbers to a user based on received process control and financial data. In particular, the screen view 280 of FIG. 6 illustrates that the diagnostics application has detected 38 modules in the incorrect mode and one module in a limited control mode. Further, there is one advisory alarm associated with the process control system. As a result of these conditions, and as determined from information provided to the diagnostics applications as described above, the screen view 280 of FIG. 6 indicates that while the performance of the plant is at 99.9 percent, the plant efficiency is only at 89.1 percent, with these percentages being determined by economic models for the plant which are configured as described above to communicate with business systems as well as the process control system to receive both financial and process control data. In one embodiment, a separate economic model may be used to determine the plant efficiency, the plant performance and the plant utilization and these models may receive any needed on-line information from the other sections of the plant, such as business applications and databases, maintenance applications and databases, etc. Of course, other plant parameters may be determined using other models including models which rely on or otherwise use economic data.

Figure 7:
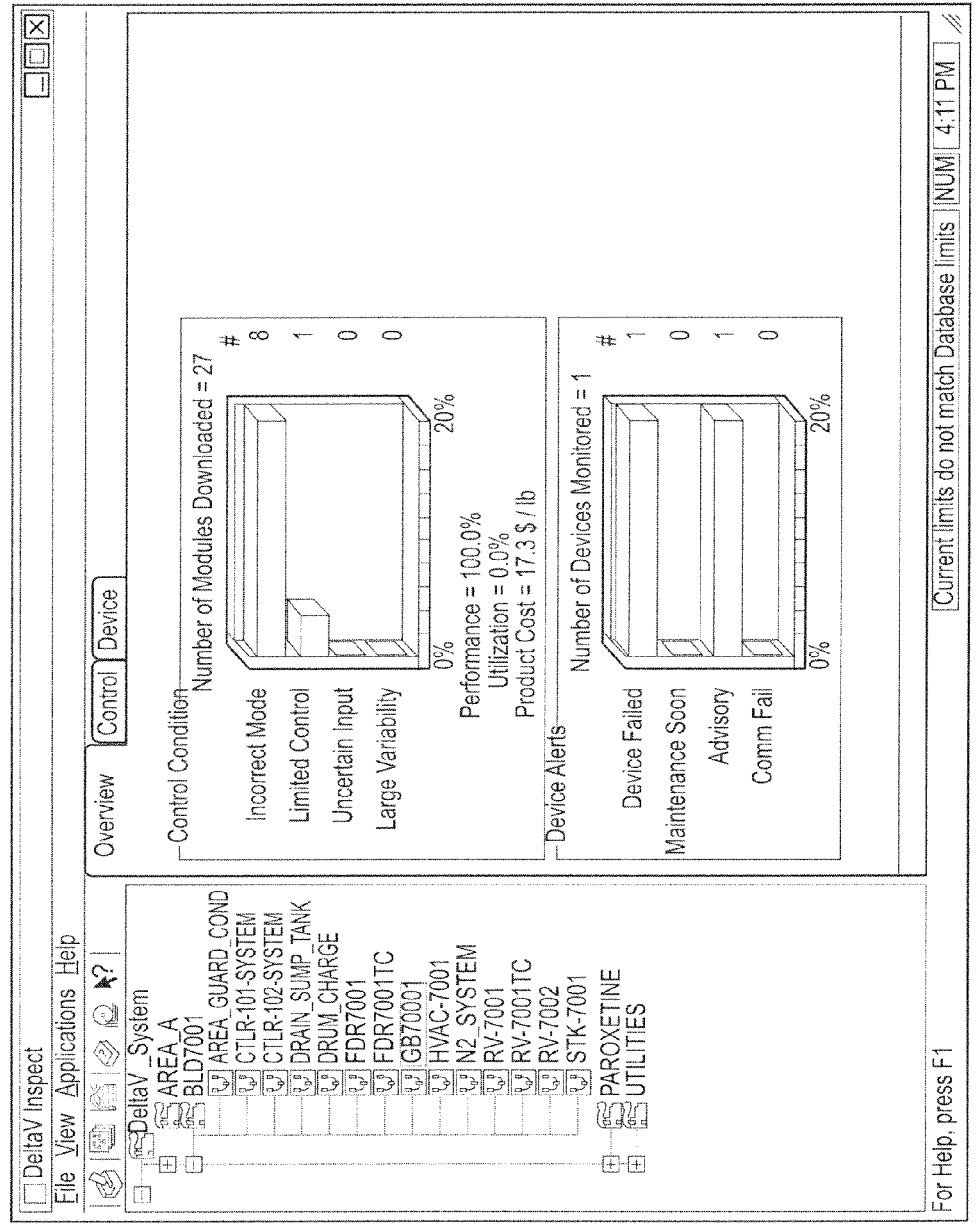
FIG. 7 is another example screen view that may be displayed to a user by one of the graphical user interfaces of the plant of FIG. 1 to provide the user with on-line financial information to be used in controlling the process plant of FIG. 1.

FIG. 7 illustrates another example screen view 285 that may be produced by the diagnostic or optimization application described above to provide product cost information to the user based on received process control and financial data. In particular, the screen view 285 of FIG. 7 illustrates that the diagnostics application has detected 8 modules in the incorrect mode and 1 module in limited control and that there is one advisory alarm and one failed device alarm associated with the process control system. The screen view 285 of FIG. 7 also indicates that the calculated current performance of the plant is at 100 percent and that the current product cost (i.e., for products currently being manufactured), is 17.3 dollars per pound. This product cost, which may be generated by another model configured to receive both process control data and financial data as discussed above, may also be provided to a reporting application that may produce a report with this information, an alarming application which may send an alarm or alert if the product cost goes above a predetermined amount, an optimizer application that may optimize the process plant based on the product cost, or any other application, such as any of the service applications 74 described above with respect to FIG. 2.

Figure 8:
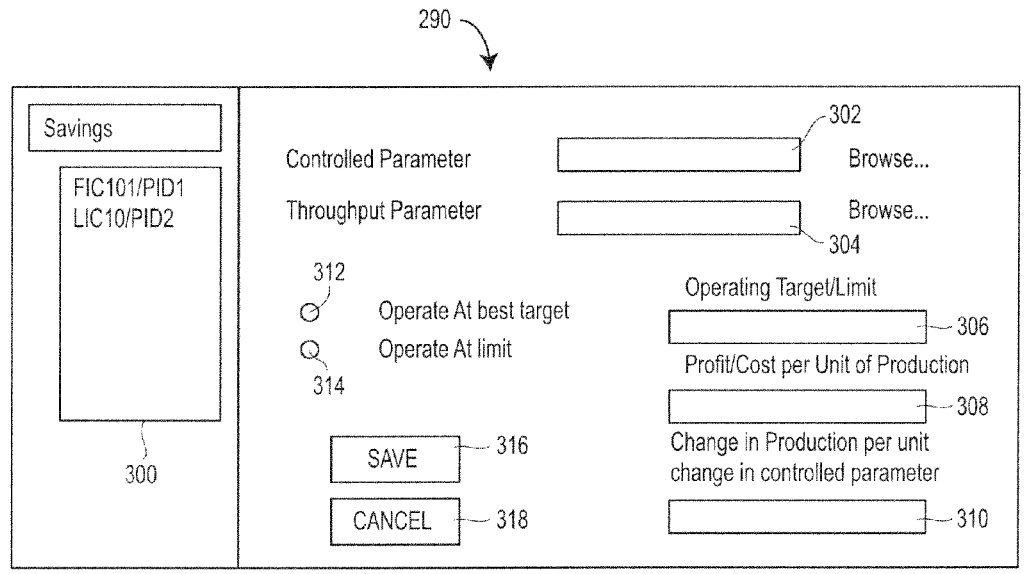
FIG. 8 is an example screen view that may be displayed to a user by one of the graphical user interfaces of the plant of FIG. 1 to enable the user to alter or effect the operation of a plant using economic data generated about the process as currently running.

FIG. 8 illustrates an example screen view 290 that may be displayed to a user by the diagnostic application discussed above to configure the calculations of savings obtained as a result of making changes to the process control system. In particular, the screen view 290 of FIG. 8 includes a menu area 300 listing, in this case, the control blocks that will be monitored and potentially changed. In FIG. 8, two PID control blocks FIC101/PID1 and LIC10/PID2 are illustrated. The user may select one of these control blocks to configure the savings calculations therefore. After that, the user may specify a controlled parameter and a throughput parameter (by typing these into boxes 302 and 304 or by browsing for these parameters within the configuration system) to be used to control or optimize the process control system. The user may also specify an operating target or limit, the profit or cost per unit of production and the change in the production per unit change in the controlled parameter at the boxes 306, 308 and 310. The process control system may include an optimizer or control application that uses these values, as well the feedback from economic models which calculate the actual profit or cost per unit of production to change control of the plant to be more optimal, i.e., in line with the operation selected by the user. The user may instruct the unit or module to operate at the best target or to operate at the limit by selecting one of the boxes 312 or 314. These user may save or cancel this configuration by selecting one of the boxes 316 or 318.

Figure 9:
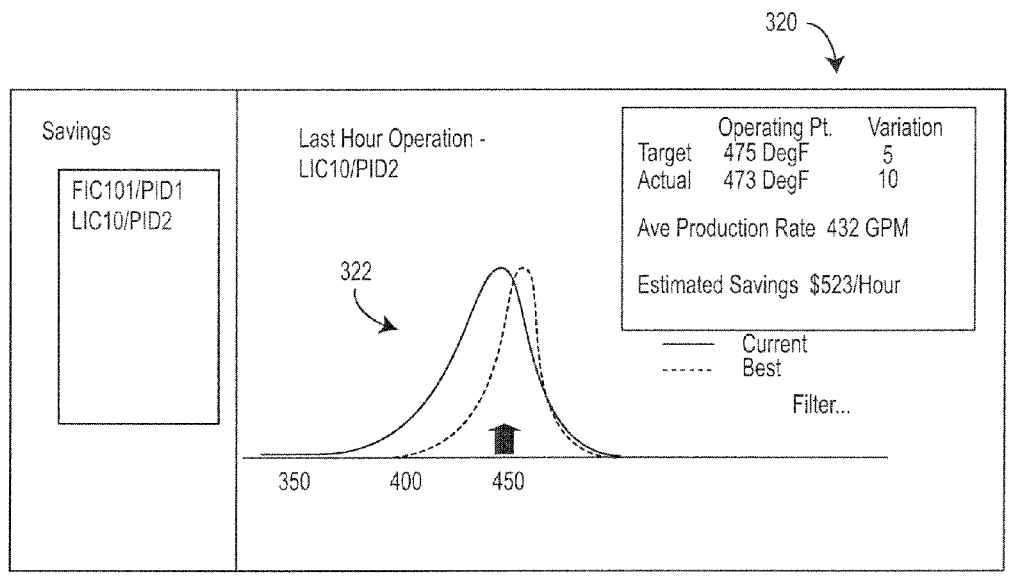
FIG. 9 is another example screen view that may be displayed to a user by one of the graphical user interfaces of the plant of FIG. 1 to view the optimal operating state of a plant using economic data generated about the process as currently running.

After having configured a savings view or calculation, and during operation of the process, the diagnostics application may collect the needed process control and financial data in the manner described above and may use the saving configuration to present an on-line savings view, such as that of FIG. 9, to a user. As indicated in FIG. 9, a savings view 320 for the LIC10/PID2 module indicates that for the last hour of operation, the temperature (i.e., the controlled variable) was at a statistic average of 473 degrees (Fahrenheit) with a variation of 10. This operation is plotted in the graph 322 of FIG. 9 with a solid line. However, the target temperature (as selected by the user in the configuration screen) is 475 degrees with a variation of 5. This target is also plotted on the graph 322 of FIG. 9 with a dotted line. The screen view 320 also illustrates the average production rate (423 gallons per minute) and the savings associated with changing from the actual operating point to the target operating point which, in this case, is illustrated as 523 dollars per hour. Of course, the estimated savings from making the change to the target production rate may be computed using an economic model that receives actual cost data from the financial or other applications within the plant that have access to this data. If desired, a filter may be used to select a different time frame over which to perform the savings calculation. In any event, the savings view, such as that of FIG. 9, is very beneficial to a user in determining how to change a process control scheme or configuration, or what to fix within a process control plant, to obtain the most financial impact.

Moreover, if desired, any information, such as the savings information, plant efficiency, etc. can be reported to plant personnel and management using the mechanisms available as part of the control system (e.g., graphic displays, events and alarming and reporting applications, etc.) or via another computer or display (such as handhelds, pagers, PDAs, etc.) using the data communication system described above.

Of course, while a diagnostic application has been described above as including models configured to receive financial data to perform economic calculations within a process control system, other types of applications can use these or other models for many other purposes. For example, optimizer, reporting and alarming applications may use economic models to provide better performance and reporting for a process control system from the standpoint of maximizing actual profit within the plant. Likewise, other diagnostic applications could use financial information for other reasons as well to, for example, determine other financial measures besides those explicitly discussed herein.

Still further, if desired, the service applications 74 (FIG. 2) may be packaged along with the process modules 73 (FIG. 2) in a smart process module such as that described in U.S. patent application Ser. No. 10/278,469, entitled "Smart Process Modules and Objects in Process Plants" which was filed Oct. 22, 2002, the disclosure of which is hereby expressly incorporated by reference herein. In that case, the smart process objects may, for example, create the display screens of FIGS. 8 and 9 based on the economic information provided to and determined by the process modules 73 contained therein.

While the web services-based communication system and economic models and process control applications described herein have been described as being implemented using an XML-based server, this combined system can be implemented using any other suitable transactional data language on any suitable hardware platform. Further, although the functions of the information server described herein are described herein as being implemented primarily as software, some or all of these functions may be implemented in hardware, firmware, etc. Thus, the web services-based communication system and technique described herein may be implemented in a standard multi-purpose processor or using specifically designed hardware or firmware as desired. When implemented in software, the software routines discussed herein may be stored in any computer readable memory such as on a magnetic disk, a laser disk, or other storage medium, in a RAM or ROM of a computer or processor, etc. Likewise, the software may be delivered to a user or a process control system via any known or desired delivery method including, for example, on a computer readable disk or other transportable computer storage mechanism or over a communication channel such as a telephone line, the Internet, etc. (which are viewed as being the same as or interchangeable with providing such software via a transportable storage medium).

Still further, while the economic model analysis has been generally described herein as having a computer model that models the economic operation of a process plant based on economic data and process control data located at the process plant, a service provider could, for a fee, provide a service of collecting the process control data (or other process plant data) and the economic data from the process plant on a regular basis (e.g., a periodic, a regularly scheduled basis, etc.) and then use a computer model to produce an output related to the operation of the plant. The output could be analyzed or used in any manner described above to determine one or more actions to be taken or performed in the process plant, including any of the control, alarming, reporting, diagnostic, optimization, etc. actions discussed above. These one or more actions, which could include providing information to be displayed to plant personnel, could then be transmitted back to the process plant to be implemented or displayed to the appropriate person or decision maker, such as a control operator, a business manager, a maintenance person, etc. The service provider may be communicatively connected to the process plant in any desired manner, such as via the Internet, the World Wide Web, a LAN or WAN connection, a telephone connection, etc. If desired, one or more servers may be set up to collect the economic data and the process plant or process control data, as indicated above, and then to automatically forward or send this data to the service provider site for analysis. Of course, the service provider may charge a fee for any or all of collecting the data, running the computer model, analyzing the output of the model to determine one or more actions to be taken in the process plant and then communicating these actions to the process plant for display or implementation. It will be understood that the computer model or other software at the service provider site (which may, if desired, be physically located at the process plant or remotely from the process plant) can implement any of the functions described above with respect to FIGS. 2-9.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A system for use in a process plant having a controller coupled to a plurality of field devices, comprising:
a data source device including economic data related to the operation of the process plant;
a diagnostic application stored on a first electronic device and communicatively connected to the controller, wherein the diagnostic application is adapted to collect diagnostic data related to abnormal operating conditions of the operation of the process plant during operation of the process plant;
an economic model incorporating both economic and diagnostic variables stored on a second electronic device and coupled to the data source and to the diagnostic application to receive and use the diagnostic data and the economic data to develop an economic parameter with respect to the operation of the process plant; and
a control application stored on a third electronic device and adapted to use the economic parameter to perform a control activity within the process plant.

2. The system of claim 1, wherein the control application is an optimizer application that produces a set of control target parameters for use in controlling the process plant to thereby optimize the operation of the process plant based on the economic parameter.

3. The system of claim 2, further including a display application adapted to enable a user to select one or more optimizer factors for use by the optimizer application in producing the set of control target parameters.

4. The system of claim 1, wherein the control application is a process control routine adapted to be executed on the controller to use the economic parameter to develop a control signal to be sent to one of the plurality of field devices within the process plant to thereby control the operation of the process plant.

5. The system of claim 1, further including a display application coupled to the economic model that is adapted to display the economic parameter to a user.

6. The system of claim 5, wherein the display application is adapted to display one or more diagnostic parameters associated with the diagnostic data in conjunction with the display of the economic parameter.

7. The system of claim 6, wherein the one or more diagnostic parameters includes parameters associated with the operation of a control loop within the process plant.

8. The system of claim 7, wherein the one or more diagnostic parameters includes a variability measure of one or more control signals within the control loop.

9. The system of claim 7, wherein the one or more diagnostic parameters includes an operational mode indication of one or more control blocks within the control loop.

10. The system of claim 7, wherein the one or more diagnostic parameters includes a limit indication for one or more control signals within the control loop.

11. The system of claim 7, wherein the one or more diagnostic parameters includes one or more alarms associated with one or more control blocks within the control loop.

12. The system of claim 1, wherein the data source is adapted to communicate with the economic model via a wireless communication channel.

13. The system of claim 1, wherein the data source is adapted to communicate with the economic model via a router disposed between the data source and the economic model.

14. The system of claim 13, wherein the data source is a hand held data source that is adapted to communicate with the router via a wireless communication channel.

15. The system of claim 1, further including an execution engine that executes the economic module during runtime of the process plant to develop the economic parameter for delivery to the control application.

16. A method of assisting performing process plant control, comprising:
collecting, on a regular basis at a service provider site, economic data related to economic factors associated with the operation of a process plant during operation of the process plant using a first data source device;
collecting, on a regular basis at a service provider site, process control data related to abnormal operating conditions of control operations within the process plant during operation of the process plant using a second data source device and wherein the process control data is time-correlated to the collected economic data;
running a computer model at the service provider site that models the operation of the process plant using the economic data and the process control data to produce a model output;
using the model output at the service provider site to determine one or more actions to be performed with respect to the operation of the process plant during operation of the process plant and
providing an indication of the one or more actions from the service provider site to the process plant for use in controlling the operation of the process plant.

17. The method of assisting performing process plant control of claim 16, further including charging a fee for one or more of running the computer model, using the computer model to determine the one or more actions and providing the indication of the one or more actions to the process plant.

18. The method of assisting performing process plant control of claim 17, wherein collecting the economic data and collecting the process control data includes collecting the economic data and the process control data at one or more information servers communicatively connected between first and second data sources and the computer model, and automatically delivering the economic data and the process control data from the one or more information servers to the computer model at the service provider site.

19. The method of assisting performing process plant control of claim 17, wherein collecting economic data includes collecting data pertaining to a cost of a material used in the process plant.

20. The method of assisting performing process plant control of claim 17, wherein collecting economic data includes collecting data pertaining to a throughput of the process plant.

21. The method of assisting performing process plant control of claim 17, wherein collecting process control data includes collecting the process control data at a field device disposed within the process plant.

22. The method of assisting performing process plant control of claim 17, wherein collecting process control data includes collecting the process control data at a process controller communicatively connected to one or more field devices disposed within the process plant.

23. The method of assisting performing process plant control of claim 17, wherein using the model output includes using the model output to determine an action designed to optimize the operation of the process plant within respect to a particular criteria.

24. The method of assisting performing process plant control of claim 23, wherein the particular criteria is one of cost or profit.

25. The method of assisting performing process plant control of claim 23, wherein the particular criteria is throughput.

26. The method of assisting performing process plant control of claim 23, wherein the particular criteria is consumption of a particular raw material.

27. The method of assisting performing process plant control of claim 17, wherein using the model output includes using the model output to determine an action related to alerting to the existence of or correcting a detected problem within the process plant.

28. The method of assisting performing process plant control of claim 27, wherein the action related to alerting to the existence of or correcting a detected problem includes generating an alarm to be delivered to a user.

29. The method of assisting performing process plant control of claim 17, wherein using the model output includes providing information for display to a user to indicate an operation of the process plant.

30. The method of assisting performing process plant control of claim 17, wherein using the computer model includes running the computer model to produce a model output indicative of an economic operational parameter associated with one of a number of control loops of the process plant and wherein the one or more actions includes generating a display screen that displays the economic operational parameter associated with the one of the control loops for viewing by a user.

31. The method of assisting performing process plant control of claim 30, further including displaying other parameters associated with the one of the control loops in conjunction with the economic operational parameter associated with the one of the control loops on the display screen.

32. The method of assisting performing process plant control of claim 30, wherein the economic operational parameter is indicative of the utilization of the one of the control loops.

33. The method of assisting performing process plant control of claim 30, wherein the economic operational parameter is indicative of the efficiency of a least a portion of the process plant.

34. The method of assisting performing process plant control of claim 30, wherein the economic operational parameter is indicative of a product production cost of the process plant.

35. The method of assisting performing process plant control of claim 17, wherein the one or more actions includes performing a control function within the process plant.

36. The method of assisting performing process plant control of claim 17, wherein the one or more actions includes providing a display to enable a user to select a control parameter to be met by a control application based on the model output.

37. The method of assisting performing process plant control of claim 36, wherein providing the display includes displaying an economic parameter associated with the control parameter selected by the user.

38. The method of assisting performing process plant control of claim 37, wherein the economic parameter is a savings parameter related to the different costs of operating the plant at different control settings.

39. The method of assisting performing process plant control of claim 36, wherein providing the display includes enabling the user to select at least one of a throughput parameter and a controlled parameter as the control parameter.

40. The method of assisting performing process plant control of claim 36, wherein providing the display includes enabling the user to specify one or more economic factors associated with the operation of the process plant for use in computing the economic parameter.

41. The method of assisting performing process plant control of claim 40, wherein the one or more economic factors includes one of a profit per unit factor and a cost per unit factor.

* * * * *